(12) United States Patent
Perry

(10) Patent No.: US 11,148,715 B2
(45) Date of Patent: Oct. 19, 2021

(54) DEVICE, METHOD, AND SYSTEM FOR ASSISTING WITH TRAILER REVERSING

(71) Applicant: Towteknik Pty Ltd, Alphington (AU)

(72) Inventor: Todd Ashley Perry, Alphington (AU)

(73) Assignee: Towteknik Pty Ltd, Alphington (AU)

( * ) Notice: Subject to any disclaimer, the term of this patent is extended or adjusted under 35 U.S.C. 154(b) by 172 days.

(21) Appl. No.: 16/362,396

(22) Filed: Mar. 22, 2019

(65) Prior Publication Data

US 2019/0217888 A1 Jul. 18, 2019

Related U.S. Application Data

(63) Continuation of application No. PCT/AU2017/051014, filed on Sep. 18, 2017.

(30) Foreign Application Priority Data

Sep. 27, 2016 (AU) .............................. 2016903909

(51) Int. Cl.
*B62D 13/06* (2006.01)
*B62D 15/02* (2006.01)
*B60R 1/00* (2006.01)
*B60R 11/04* (2006.01)

(52) U.S. Cl.
CPC .............. *B62D 13/06* (2013.01); *B60R 1/002* (2013.01); *B60R 11/04* (2013.01); *B62D 15/023* (2013.01); *B62D 15/028* (2013.01); *B62D 15/0275* (2013.01); *B60R 2300/301* (2013.01); *B60R 2300/302* (2013.01); *B60R 2300/8026* (2013.01)

(58) Field of Classification Search
CPC .......... B62D 15/0275; B62D 15/028; B62D 15/023; B62D 13/06; B60R 1/002; B60R 2300/301; B60R 2300/302; B60R 2300/8026; B60R 11/04

USPC ............................................................ 701/41
See application file for complete search history.

(56) References Cited

U.S. PATENT DOCUMENTS

| 9,108,598 B2* | 8/2015 | Headley ............... B62D 15/027 |
| 10,875,573 B2* | 12/2020 | Sanvicente Herrera .................... B62D 13/06 |
| 2012/0091259 A1* | 4/2012 | Morris .................... B64C 27/02 244/17.13 |

(Continued)

FOREIGN PATENT DOCUMENTS

| CN | 104590116 A | * | 5/2015 | ............... B60D 1/62 |
| CN | 104590158 A | * | 5/2015 | ............. B62D 13/06 |

(Continued)

OTHER PUBLICATIONS

International Search Report and Written Opinion dated Nov. 29, 2017 in International Patent Application No. PCT/AU2017/051014. 21 pages.

*Primary Examiner* — Atul Trivedi
(74) *Attorney, Agent, or Firm* — Kilpatrick Townsend & Stockton LLP

(57) ABSTRACT

A method for providing a driver of a vehicle towing a trailer with reversing information, comprising the steps of: capturing image data of a region behind the trailer; measuring an angle between the vehicle and the trailer; generating auxiliary data 5 comprising reversing aid information at least in part in accordance with the angle; generating display data in accordance with the image data and the auxiliary data; and presenting the display data on a display.

20 Claims, 21 Drawing Sheets

(56) References Cited

U.S. PATENT DOCUMENTS

| | | | |
|---|---|---|---|
| 2014/0052337 A1* | 2/2014 | Lavoie | B62D 15/027 701/41 |
| 2014/0058622 A1* | 2/2014 | Trombley | B62D 13/06 701/33.2 |
| 2014/0058655 A1* | 2/2014 | Trombley | B62D 15/027 701/300 |
| 2014/0058668 A1* | 2/2014 | Trombley | B62D 13/06 701/523 |
| 2014/0085472 A1* | 3/2014 | Lu | B60R 1/002 348/148 |
| 2014/0160276 A1* | 6/2014 | Pliefke | H04N 5/272 348/118 |
| 2014/0172232 A1* | 6/2014 | Rupp | B62D 13/06 701/36 |
| 2014/0188344 A1* | 7/2014 | Lavoie | B62D 15/028 701/41 |
| 2014/0188346 A1* | 7/2014 | Lavoie | B62D 13/06 701/42 |
| 2014/0210456 A1* | 7/2014 | Crossman | B60W 30/12 324/207.2 |
| 2014/0277942 A1* | 9/2014 | Kyrtsos | B60W 10/18 701/41 |
| 2014/0297128 A1* | 10/2014 | Lavoie | B60W 30/045 701/41 |
| 2014/0297129 A1* | 10/2014 | Lavoie | G01B 21/02 701/41 |
| 2014/0303849 A1* | 10/2014 | Hafner | B60W 50/14 701/42 |
| 2014/0309888 A1 | 10/2014 | Smit et al. | |
| 2014/0324295 A1* | 10/2014 | Lavoie | H04N 7/183 701/41 |
| 2014/0343793 A1* | 11/2014 | Lavoie | B60W 10/18 701/41 |
| 2014/0358417 A1* | 12/2014 | Lavoie | B60K 35/00 701/300 |
| 2014/0358424 A1* | 12/2014 | Lavoie | B60D 1/62 701/428 |
| 2014/0379217 A1* | 12/2014 | Rupp | B62D 15/027 701/41 |
| 2015/0158527 A1* | 6/2015 | Hafner | B62D 15/027 701/41 |
| 2015/0198949 A1* | 7/2015 | Boos | B62D 15/0285 701/2 |
| 2015/0203156 A1* | 7/2015 | Hafner | B62D 15/027 701/36 |
| 2015/0210317 A1* | 7/2015 | Hafner | B62D 15/0275 701/41 |
| 2015/0217693 A1* | 8/2015 | Pliefke | B62D 13/06 348/118 |
| 2015/0251693 A1* | 9/2015 | Lavoie | B60W 10/18 701/41 |
| 2015/0251697 A1* | 9/2015 | Lavoie | B62D 13/06 701/523 |
| 2015/0367886 A1* | 12/2015 | Lavoie | B62D 15/0275 701/41 |
| 2016/0023526 A1* | 1/2016 | Lavoie | B62D 15/0285 701/41 |
| 2016/0031482 A1* | 2/2016 | Lavoie | B60W 10/20 701/41 |
| 2016/0039456 A1* | 2/2016 | Lavoie | B60D 1/62 701/41 |
| 2016/0101810 A1* | 4/2016 | Xu | G01B 21/22 701/41 |
| 2016/0101811 A1* | 4/2016 | Kyrtsos | B62D 15/0285 701/25 |
| 2016/0159347 A1* | 6/2016 | Lavoie | B60W 30/10 701/41 |
| 2016/0229451 A1* | 8/2016 | Raad | B62D 13/06 |
| 2016/0332572 A1* | 11/2016 | Gibeau | B60L 53/124 |
| 2016/0362135 A1* | 12/2016 | Xu | B62D 13/06 |
| 2017/0008559 A1* | 1/2017 | Shepard | B62D 13/06 |
| 2017/0029024 A1* | 2/2017 | Lavoie | B62D 13/06 |
| 2017/0050672 A1* | 2/2017 | Gieseke | B60W 10/184 |
| 2017/0073003 A1* | 3/2017 | Shepard | B62D 13/06 |
| 2017/0080974 A1* | 3/2017 | Lavoie | B60K 37/02 |
| 2017/0106796 A1* | 4/2017 | Lavoie | B60R 1/00 |
| 2017/0129403 A1* | 5/2017 | Lavoie | B62D 15/027 |
| 2017/0151846 A1* | 6/2017 | Wuergler | B60D 1/62 |
| 2017/0174023 A1* | 6/2017 | Hu | B60D 1/06 |
| 2017/0174130 A1* | 6/2017 | Hu | B60D 1/06 |
| 2017/0177949 A1* | 6/2017 | Hu | G06T 7/12 |
| 2017/0217368 A1* | 8/2017 | Lewis | B60R 11/04 |
| 2017/0240204 A1* | 8/2017 | Raad | B62D 15/025 |
| 2017/0254873 A1* | 9/2017 | Koravadi | G01S 19/45 |
| 2017/0297619 A1* | 10/2017 | Lavoie | B62D 15/024 |
| 2017/0297620 A1* | 10/2017 | Lavoie | B62D 5/04 |
| 2017/0313351 A1* | 11/2017 | Lavoie | B62D 13/06 |
| 2018/0029641 A1* | 2/2018 | Solar | G06T 7/90 |
| 2018/0043933 A1* | 2/2018 | Hu | G06K 9/4609 |
| 2018/0186290 A1* | 7/2018 | Ward | B60R 1/00 |
| 2018/0208241 A1* | 7/2018 | Shepard | B60D 1/62 |
| 2018/0276838 A1* | 9/2018 | Gupta | B62D 15/027 |
| 2018/0346024 A1* | 12/2018 | Lavoie | B62D 15/027 |
| 2019/0016264 A1* | 1/2019 | Potnis | B60D 1/64 |
| 2019/0061816 A1* | 2/2019 | Stabel | B62D 53/0871 |
| 2019/0061817 A1* | 2/2019 | Mattern | B62D 13/06 |
| 2019/0135216 A1* | 5/2019 | Church | H04N 7/18 |
| 2019/0161118 A1* | 5/2019 | Greenwood | B62D 15/0285 |
| 2019/0164427 A1* | 5/2019 | Greenwood | G08G 1/095 |
| 2020/0017143 A1* | 1/2020 | Gali | B62D 15/028 |
| 2020/0086702 A1* | 3/2020 | Ling | B60D 1/62 |
| 2020/0130582 A1* | 4/2020 | Wong | B62D 15/0285 |
| 2020/0164919 A1* | 5/2020 | Cotter | B62D 15/025 |
| 2020/0247470 A1* | 8/2020 | Dottavio | B62D 15/025 |
| 2020/0247471 A1* | 8/2020 | Grodde | B62D 15/0275 |
| 2020/0255066 A1* | 8/2020 | Niewiadomski | B60D 1/62 |
| 2020/0298639 A1* | 9/2020 | Niewiadomski | B60R 11/04 |
| 2020/0356788 A1* | 11/2020 | Joseph | B60R 11/04 |
| 2020/0361261 A1* | 11/2020 | Joseph | B60D 1/62 |
| 2020/0361466 A1* | 11/2020 | Xu | B60D 1/62 |
| 2020/0369320 A1* | 11/2020 | Niewiadomski | B60W 10/20 |
| 2020/0398753 A1* | 12/2020 | Lu | B60R 1/00 |

FOREIGN PATENT DOCUMENTS

| | | | | |
|---|---|---|---|---|
| DE | 10030738 C1 | 8/2001 | | |
| DE | 102005045196 A1 | 9/2006 | | |
| DE | 102004025252 B4 | 7/2009 | | |
| GB | 2568746 A * | 5/2019 | | G06K 9/00812 |
| WO | WO-2012103193 A1 * | 8/2012 | | G06T 7/73 |
| WO | WO-2014174028 A1 * | 10/2014 | | G06K 9/00805 |
| WO | 2015001066 A2 | 1/2015 | | |

\* cited by examiner

DEVICE, METHOD, AND SYSTEM FOR ASSISTING WITH TRAILER REVERSING

CROSS-REFERENCES TO RELATED APPLICATIONS

This application is a continuation application of International Patent Application No. PCT/AU2017/051014 entitled "DEVICE, METHOD, AND SYSTEM FOR ASSISTING WITH TRAILER REVERSING," filed on Sep. 18, 2017, which claims priority to Australian Patent Application No. 2016903909, filed on Sep. 27, 2016, all of which are herein incorporated by reference in their entirety for all purposes.

FIELD OF THE INVENTION

The invention generally relates to providing assistance to a driver when reversing.

BACKGROUND OF THE INVENTION

Towing a trailer is generally an infrequent task for most drivers, and reversing a trailer itself only constitutes a small percentage of total travel time when towing the trailer. Reversing involves a driver utilising side and rear mirrors in combination of looking rearward, whilst steering the tow vehicle and hence the trailer to the desired destination. This process does not come naturally to a lot of drivers as tow vehicle steering is counterintuitive to steering the trailer in the desired direction. Consequently the majority of vehicle drivers find the trailer reversing and parking task difficult.

To further complicate the task, trailers increase the blind-zone behind the vehicle. Often horse floats, caravans (travel trailers) and boats obstruct the view behind the vehicle, and box trailers are often too low to be seen in the towing vehicle rear vision mirror or whilst looking rearward. In both cases the driver may have to be overly reliant upon side mirrors to see what is happening behind the tow vehicle. This is further exacerbated with trailers of shorter and/or single wheel bases, which have a faster reaction rate to tow vehicle steering inputs compared to trailers with longer and/or multiple wheel bases. These factors contribute to the risk of a trailer jack-knife, i.e. the angle of the tow vehicle and trailer being so acute that the tow vehicle and trailer come into contact and potentially cause damage.

BRIEF SUMMARY OF THE INVENTION

According to an aspect of the present invention, there is provided a method for providing a driver of a vehicle towing a trailer with reversing information, comprising the steps of: capturing image data of a region behind the trailer; measuring an angle between the vehicle and the trailer; generating auxiliary data comprising reversing aid information at least in part in accordance with the angle; generating display data in accordance with the image data and the auxiliary data; and presenting the display data on a display, wherein the auxiliary data.

The image data may be captured by a camera apparatus comprising at least one camera positioned facing the region behind the trailer. Optionally, at least one camera is positioned on a rear portion of the trailer. Optionally, at least one camera is affixed to a mount extending above or to the side of the trailer. The image data typically comprises video data captured by the, or each, camera.

The method may further comprise the step of: measuring the angle with an angle measurement apparatus. Optionally, the angle measurement apparatus obtains at least one measured distance utilising at least one wireless signal. In this case, the angle measurement apparatus may comprise: a first wireless emitter for generating a first wireless signal; a second wireless emitter for generating a second wireless signal; and a target for receiving the first and second wireless signals, and thereby determine a current distance between the target and the first and second wireless emitters. The target may comprise at least two detection points, each configured for obtaining a distance between itself and each of the first and second wireless emitters. Typically, the target is positioned the vehicle and the first and second wireless emitters are positioned spaced apart from one another on the trailer. Alternatively, the angle measurement apparatus may comprise at least one time-of-flight (ToF) sensor configured to determine a distance between at least one position on the trailer and the vehicle. The, or each, ToF sensor may be configured to determine a distance between one or more targets placed on the trailer and the vehicle. Alternatively, the angle measurement apparatus optionally comprises a protractor coupled to an electronic sensor for generating angle measurements. In this case, the angle measurement apparatus may comprise: a first connector configured to be coupled to the vehicle and a second connector configured to be coupled to the trailer, wherein the first and second connectors are rotatably coupled to one another; and an electronic sensor configured to produce an electronic signal representing the current relative rotational position of the first connector to the second connector. The method optionally comprises the step of calibrating the angle measurement apparatus.

Preferably, the angle is about a tow ball or other pivot point between the trailer and the vehicle or at least substantially corresponds to an angle made at said pivot.

The auxiliary data may correspond to an overlay that is suitable for overlaying onto the image data. The reversing aid information may comprise one or more of: a current angle graphic for indicating the current angle between trailer and vehicle; an angle rate of change graphic for indicating the current rate at which the angle is changing; a trailer direction graphic for indicating a direction of movement; a direction to straighten graphic for providing a graphical indication of which direction to steer in order to cause the angle to reduce to zero degree; a jack-knife alarm for indicating when the angle is greater than a threshold angle; and a distance indicator for indicating the distance between the rear of the trailer and an object located behind the trailer.

The method may further comprise the steps of: communicating the captured image data to a controller; communicating the angle to the controller; and generating the auxiliary data with the controller in accordance with the angle and the display data. Optionally, the method includes communicating wirelessly at least one of the captured image data and the angle to the controller. Optionally, the controller is interfaced with the display such as to cause the display to display the display data, and wherein the display and the controller are components of the same device. In this case, the display and the controller may be components of a smartphone or other portable computing device. Alternatively, the controller is optionally a component of a different device to the display. In this case, the display may be a feature of the vehicle.

The method may further comprise the step of: obtaining proximity information indicative of a distance between the rear of the trailer and an object located behind the trailer, wherein the auxiliary data is at least in part generated in accordance with the proximity information.

According to another aspect of the present invention, there is provided a reversing aid system for providing a driver of a vehicle towing a trailer with reversing information, the system comprising: a camera apparatus comprising at least one camera configured to capture image data of a region behind the trailer; an angle measurement apparatus configured to generate an angle measurement corresponding to a measurement of an angle between the vehicle and the trailer; a display configured to display received display data; and a controller configured to: receive the angle measurement of the angle measurement apparatus and the image data from the image capture arrangement; generate auxiliary data comprising reversing aid information at least in part in accordance with angle measurement; generate display data in accordance with the image data and the auxiliary data; and communicate the display data to the display.

At least one camera may be configured to be positioned on a rear portion of the trailer. A mount may extend above or to the side of the trailer to which at least one camera is affixed.

The image data may comprise video data captured by the, or each, camera.

Optionally, the angle measurement apparatus is configured to obtain at least one measured distance utilising at least one wireless signal. The angle measurement apparatus may comprise: a first wireless emitter configured to generate a first wireless signal; a second wireless emitter configured to generate a second wireless signal; and a target configured to receive the first and second wireless signals, and thereby determine a current distance between the target and the first and second wireless emitters. The target may comprise at least two detection points, each configured for obtaining a distance between itself and each of the first and second wireless emitters. Typically, the target is configured for positioning on the vehicle and the first and second wireless emitters are configured for positioning spaced apart from one another on the trailer. Alternatively, the angle measurement apparatus may comprise at least one time-of-flight (ToF) sensor configured to determine a distance between at least one position on the trailer and the vehicle. The, or each, ToF sensor may be configured to determine a distance between one or more targets placed on the trailer. Alternatively, the angle measurement apparatus may comprise mechanical means coupled to an electronic sensor for generating angle measurements. In this case, the angle measurement apparatus may comprise: a first connector coupled to the vehicle and a second connector coupled to the trailer, wherein the first and second connectors are rotatably coupled to one another; and an electronic sensor configured to produce an electronic signal representing the current relative rotational position of the first connector to the second connector.

Preferably, the angle is about a pivot point between the trailer and the vehicle, such as tow ball, or at least substantially corresponds to an angle made at said pivot.

The auxiliary data may correspond to an overlay of the image data. The reversing aid information may comprise one or more of: a current angle graphic for indicating the current angle between trailer and vehicle; an angle rate of change graphic for indicating the current rate at which the angle is changing; a trailer direction graphic for indicating a direction of movement; a direction to straighten graphic for providing a graphical indication of which direction to steer in order to cause the angle to reduce to zero degree; a "jack-knife" alarm for indicating when the angle is greater than a threshold angle; and a distance indicator for indicating the distance between the rear of the trailer and an object located behind the trailer.

The captured image data and the angle measurement may be each communicated wirelessly to the controller.

The controller may be interfaced with the display such as to cause the display to display the display data, and wherein the display and the controller are components of the same device. In this case, the display and the controller are optionally components of a portable computing device, such as a smartphone. Alternatively, the controller may be a component of a different device to the display. In this case, the display unit is optionally a feature of the vehicle.

The system may further comprise one or more proximity sensors configured to obtain proximity information indicative of a distance between the rear of the trailer and an object located behind the trailer, and communicate said proximity information to the controller, wherein the auxiliary data is at least in part generated in accordance with the proximity information.

The system may further comprise a calibration unit configured to calibrate the angle measurement apparatus.

According to another aspect of the present invention, there is provided a method for operating a portable computing device to provide a driver of a vehicle towing a trailer with reversing information, wherein the portable computing device comprises a controller and a display interfaced with the controller, comprising the steps of: receiving at the controller image data of a region behind the trailer captured by at least one camera; receiving at the controller an angle measurement corresponding to an angle between the vehicle and the trailer; generating auxiliary data comprising reversing aid information at least in part in accordance with the measured angle; generating display data in accordance with the image data and the auxiliary data; the controller providing the display data to the display; and the display presenting the display data.

According to another aspect of the present invention, there is provided a computer program comprising code configured to implement the above method when executed by the portable computing device.

According to another aspect of the present invention, there is provided a reversing aid apparatus comprising a controller interfaced with a display, wherein the controller is configured to: receive a communication from a camera apparatus comprising image data of a region behind the trailer captured by at least one camera of the camera apparatus; receive a communication from an angle measurement arrangement comprising an angle measurement corresponding to an angle between the vehicle and the trailer; generate auxiliary data at least in part in accordance with the measured angle, wherein the auxiliary data comprises reversing aid information; generate display data in accordance with the image data and the auxiliary data; and provide the display data to the display.

According to another aspect of the present invention, there is provided a method for calibrating an angle measurement apparatus, wherein the angle measurement apparatus is configured to produce angle measurements corresponding to an angle between a vehicle and a trailer, comprising the steps of: driving the vehicle and trailer; intermittently obtaining angle measurements from the angle measurement apparatus corresponding to the angle when the vehicle and trailer are driving in a substantially straight direction; calibrating the angle measurement apparatus in accordance with the obtained angle measurements.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DETAILED DESCRIPTION OF THE INVENTION

Figure 1A:
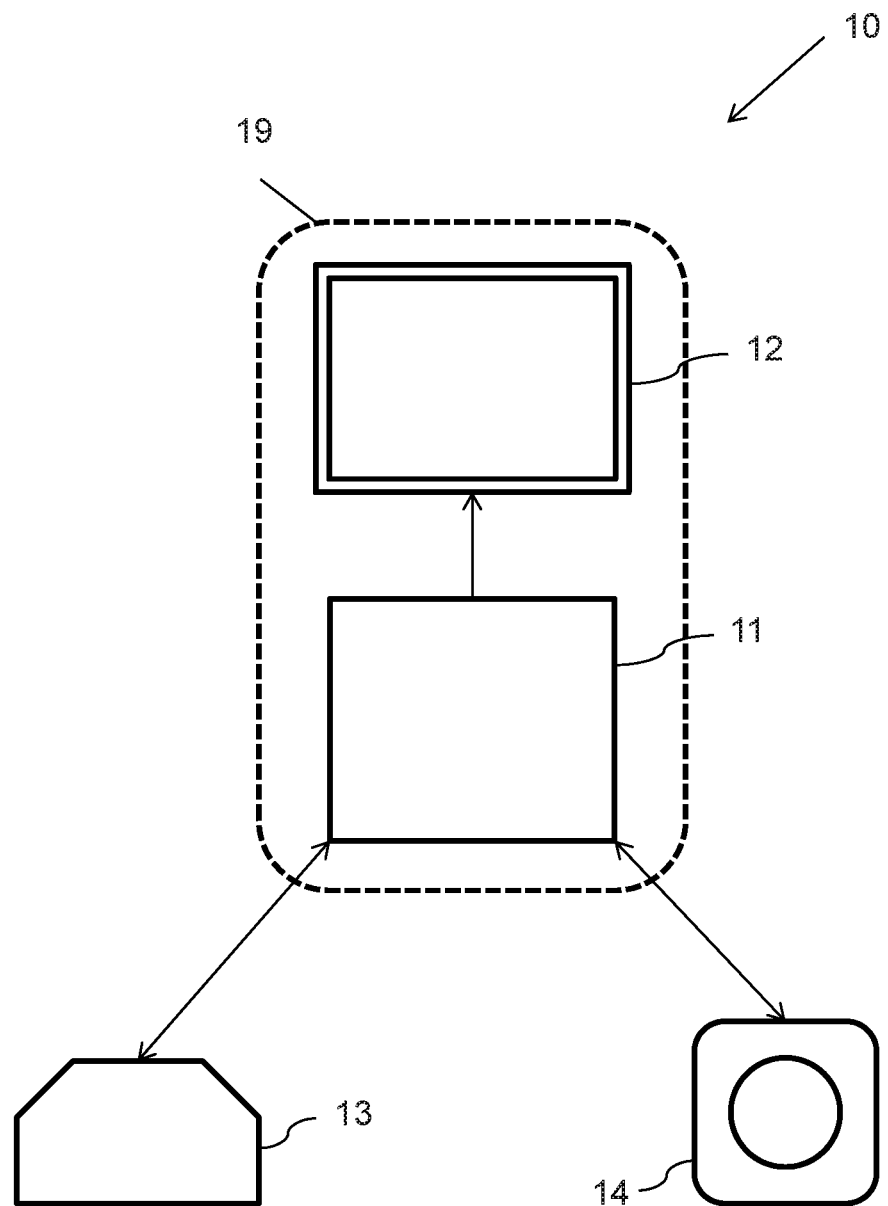
FIG. 1A shows a representation of a reversing aid system.

FIG. 1A show a schematic of a reversing aid system 10. The system 10 comprises a reversing aid apparatus 19 comprising a controller 11 in communication with a display 12, and in communication with an angle measurement apparatus 13 and in separate communication with a camera apparatus 14. Either or both of the angle measurement apparatus 13 and the camera apparatus 14 may be in wireless communication with the controller 11, for example using one or more of the following standards: Wi-Fi; Bluetooth; ZigBee; etc. However, in an alternative embodiment, one or both of the angle measurement apparatus 13 and the camera apparatus 14 are in wired-only communication with the controller 11, utilising, for example, USB or Ethernet. The angle measurement apparatus 13 can utilise the same or different communication standard to the camera apparatus 14.

Figure 1B:
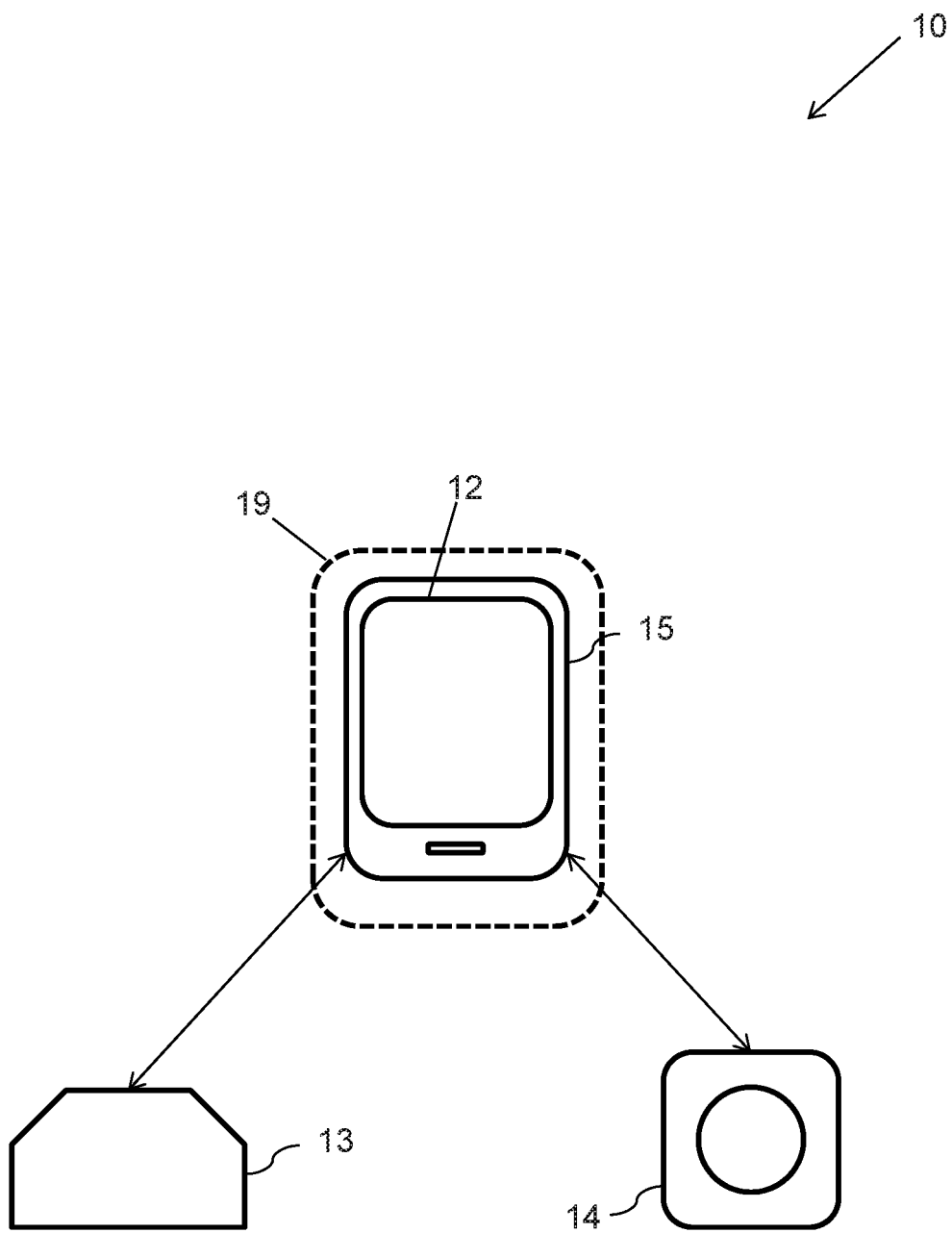
FIG. 1B shows the reversing aid system having a portable computing device.

FIG. 1B shows an embodiment of the reversing aid system 10, comprising a portable computing device 15, such as a so-called "smartphone", including the controller 11 (not shown, as it forms an internal component of the portable computing device 15) and the display 12. The portable computing device 15 corresponds in this sense to the reversing aid apparatus 19, as shown. The portable computing device 15 comprises a wireless communication interface configured for wireless data communication with both of the angle measurement apparatus 13 and the camera apparatus 14.

The display 12 is configured for displaying display data generated by the controller 11. The reversing aid apparatus 19 may constitute a single physical device having both the display 12 and the controller 11, or can include a device corresponding to the display 12 and a separate device (i.e. not within the same housing) corresponding to the controller 11.

Figure 2:
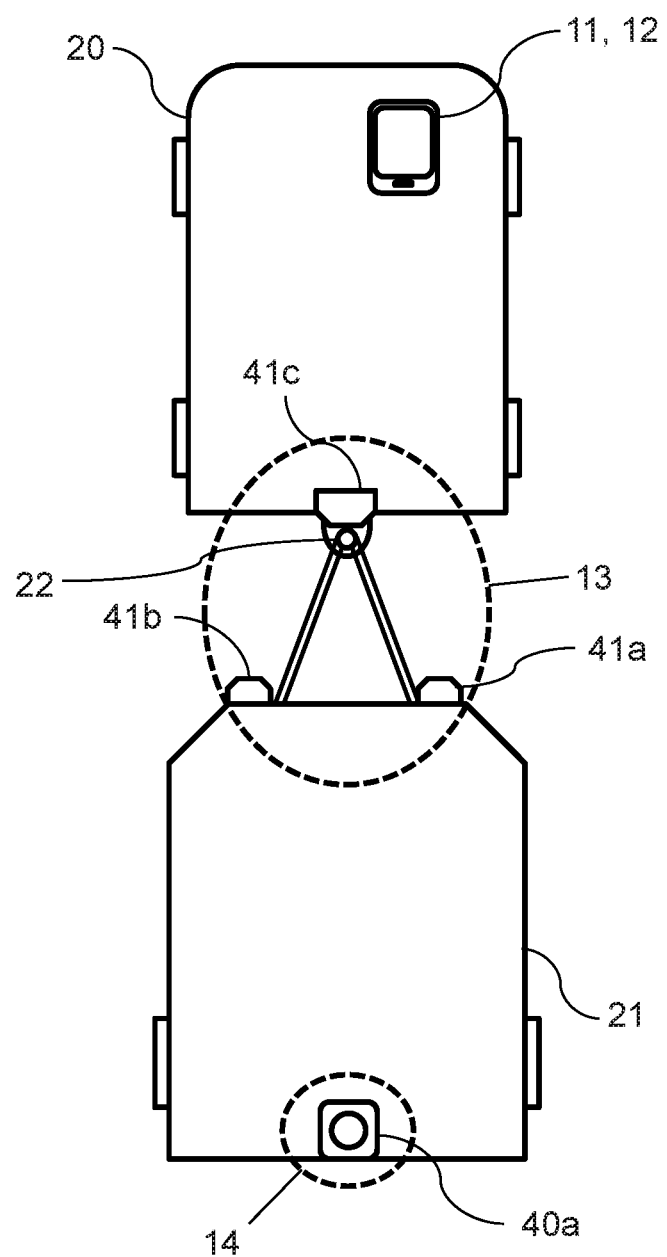
FIG. 2 shows a representation of a vehicle and a trailer, indicating relative positions of components of the reversing aid system.

FIG. 2 shows a top-down schematic view of a vehicle 20 and trailer 21 showing the relative positions of the components of the reversing aid system 10. As will be apparent, the components may be positioned in different locations depending upon the embodiment. The trailer 21 is hitched to the vehicle 20 using a conventional hitch arrangement, such as a tow ball hitch arrangement.

The camera apparatus 14 comprises one or more cameras 40 (one camera 40a is shown in the figure) located at or near the rear of the trailer 21. In particular, the one or more cameras 40 are located and positioned such as to capture image data in the form of still images or video of a region behind the trailer 21. It is envisaged that other locations may be suitable for locating at least one camera 40, as long as said locations allow for a suitable region behind the trailer 21 to be captured. In another embodiment, the camera apparatus 14 comprises a plurality of cameras 40, such as two.

The display 12 is positioned such as to be visible to the driver of the vehicle 20. In the embodiment of FIG. 2, the controller 11 and the display 12 are located within the same housing. In another embodiment, such as where the controller 11 is located in a separate housing and is in communication with the display 12 via a suitable connection, the controller 11 can be located wherever suitable.

The angle measurement apparatus 13 is located in proximity to a pivot point 22 associated with the vehicle 20 and the trailer 21 (typically at or near the tow bar of the vehicle 20), such that it can measure an angle 30 between the vehicle 20 and the trailer 21.

Figure 3A:
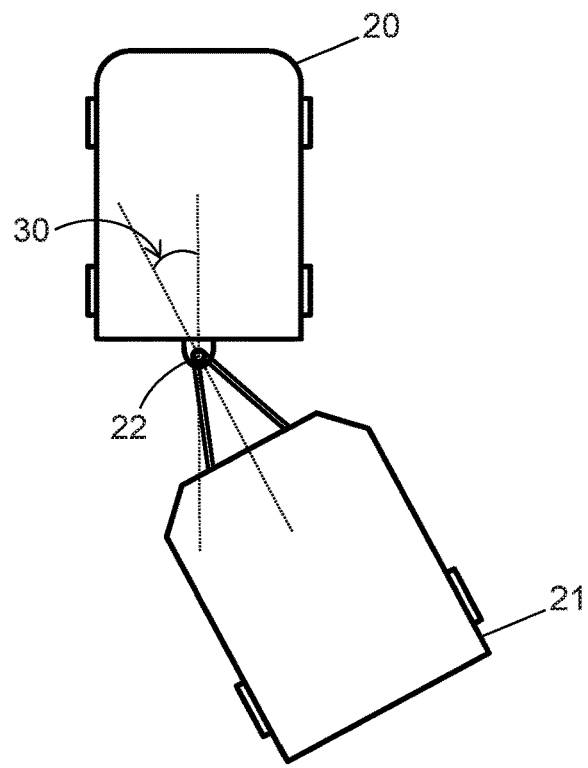
FIGS. 3A and 3B show variations in an angle between the vehicle and trailer.
Figure 3B:
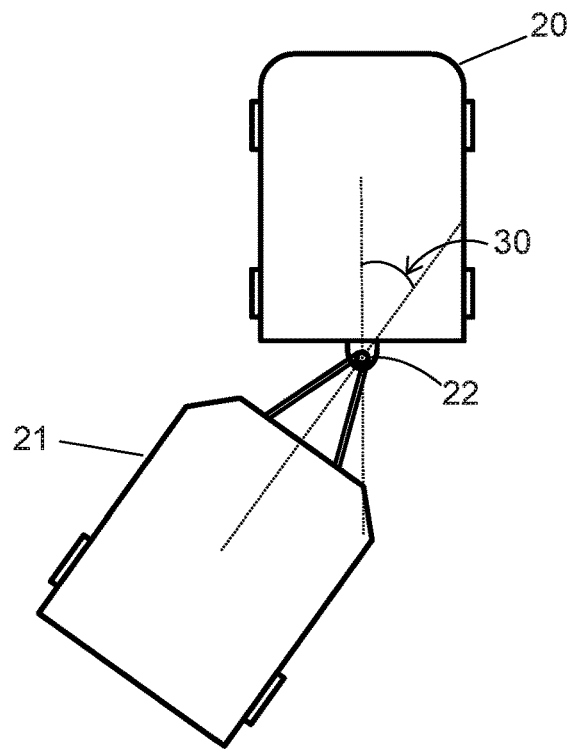

Referring to FIGS. 3A and 3B, show an angle 30 between the vehicle 20 and the trailer 21 which is measured by the angle measurement apparatus 13. This angle 30 can change due to movement of the vehicle 20 and trailer 21, for example, due to steering actions of the driver of the vehicle 20. Thus, the angle measurement apparatus 13 can embody any suitable arrangement of one or more sensors 41 suitable for determining the angle 30. Referring back to FIG. 2, the angle measurement apparatus 13 is shown, according to an embodiment, comprising three sensor components (first wireless emitter 41a, second wireless emitter 41b, and target 41c). The angle 30 measured by the angle measurement apparatus 13 may be displaced by a small amount from the specific pivot point 22. However, the angle 30 should be sufficiently close to the pivot point 22 such that any errors can be corrected, for example, through calibration.

The controller 11 is configured to receive an angle measurement obtained by the angle measurement apparatus 13. The angle measurement corresponds to a measure of the current value of angle 30 or information from which the controller 11 can determine the current value of angle 30 (e.g. the angle measurement apparatus 13 may generate raw data which the controller 11 converts into a value corresponding to angle 30). The controller 11 is also configured to receive the image data captured by the camera apparatus 14. The image data and the angle measurement should be received by the controller 11 in "real-time" (there should be no undue delay between the capture of the image data and/or obtaining the angle measurement and the communication of these to the controller 11).

The controller 11 is further configured to generate display data, which is suitable for displaying on the display 12. The display data is generated in accordance with the image data and auxiliary data generated at least in part in accordance with the angle measurement. The auxiliary data typically corresponds to an overlay for applying to the image data. Said another way, the display data corresponds to the image data with an overlay corresponding to the auxiliary data. The display data typically corresponds to video data.

The display data is configured to enable feedback ("reversing aid information") to be presented to the driver of the vehicle 20 in order to assist with reversing the vehicle 20 and the trailer 21. Thus, the display data, which is generated in accordance with the received image data and angle measurement, should represent, with sufficient accuracy for the driver to undertake driving actions, the current state of the vehicle 20, trailer 21, and position of both within their environment (i.e. with respect to the region behind the trailer 21).

Figure 4A:
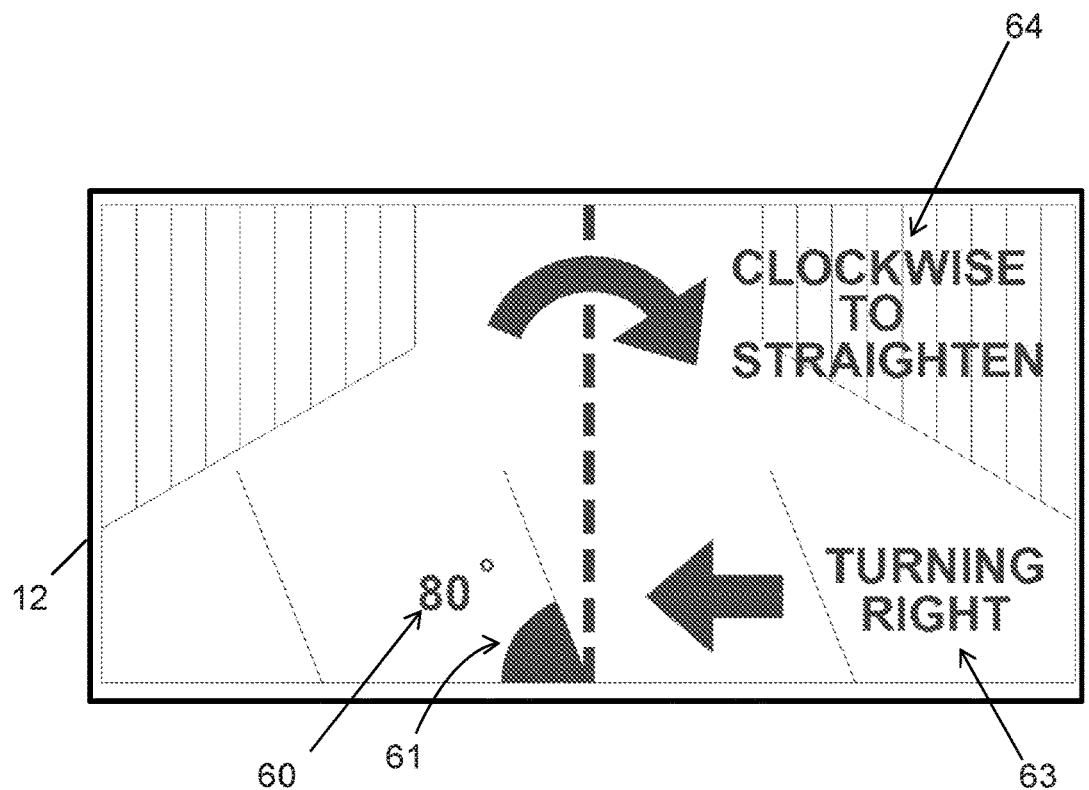
FIGS. 4A, 4B and 4C show examples of feedback presented on a display.
Figure 4B:
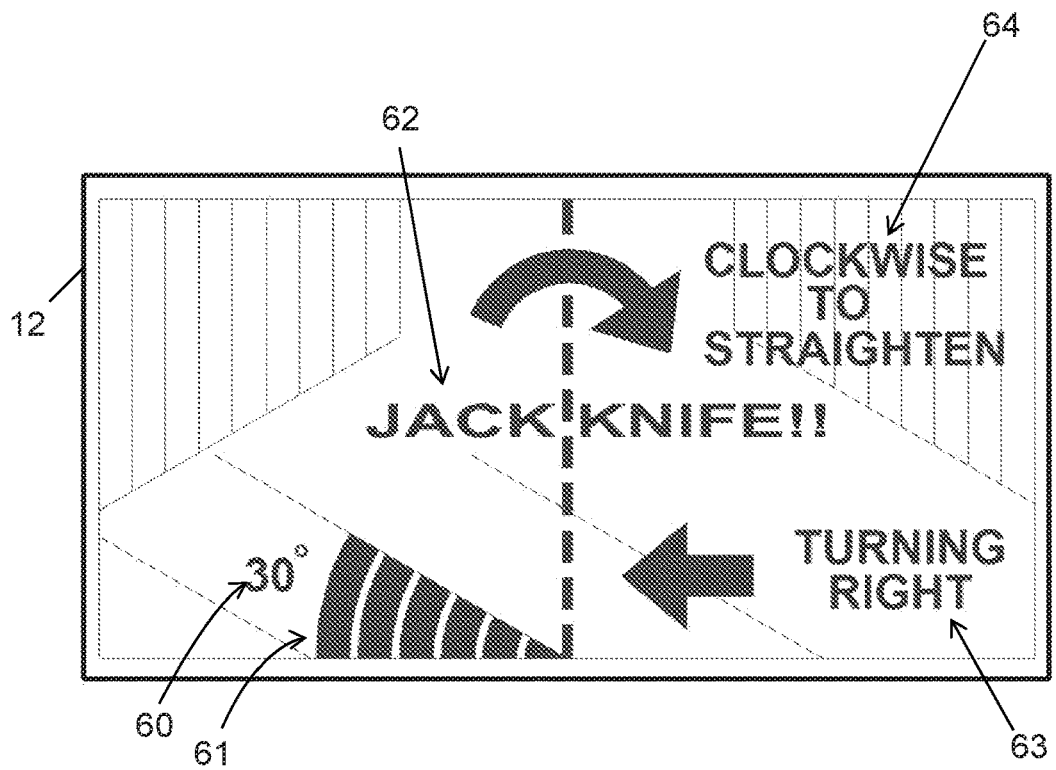

FIGS. 4A and 4B show examples of such reversing aid information provided by the display data as it is displayed on the display 12. In both figures, the display 12 is showing:

A current angle graphic 60, indicating the current angle 30 between trailer 21 and vehicle 20 (this shown both as a graphic indicator and a numerical value).

An angle rate of change graphic 61, indicating the current rate at which angle 30 is changing (this is shown as a graphic which size changes in proportion to the rate of change)

A trailer direction graphic 63 expresses a direction of movement (e.g. turning right, turning left, or straight).

A direction to straighten graphic 64 provides a graphical indication of which direction to steer in order to cause the angle to reduce to zero degrees (i.e. to straighten the trailer).

Figure 4C:
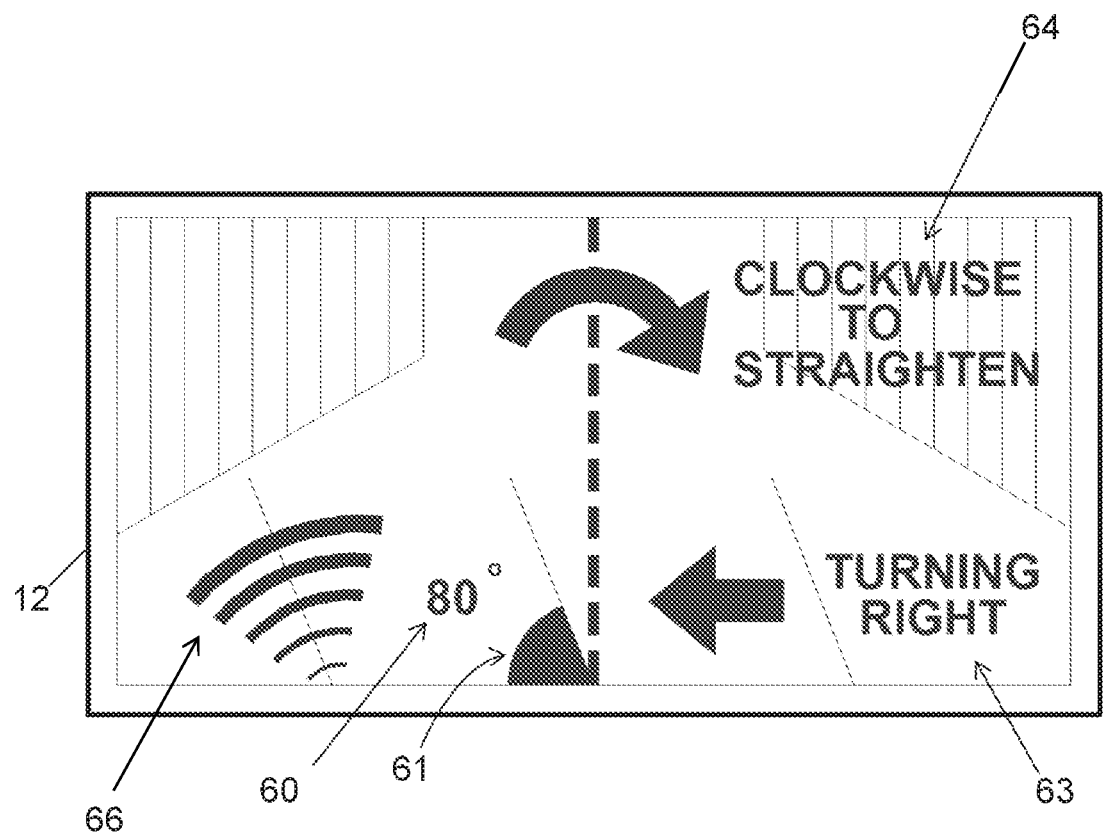

FIG. 4B also shows a "jack-knife" alarm 62 which is generated when the controller 11 determines that the angle 30 has exceeded a preconfigured threshold. The figures show a representation of the image data, being a representation of a region behind the trailer 21. FIG. 4C shows a distance indicator 66 which provides an indication of the distance between the rear of the trailer 21 and an object located behind the trailer (a fence in the figure).

Figure 5A:
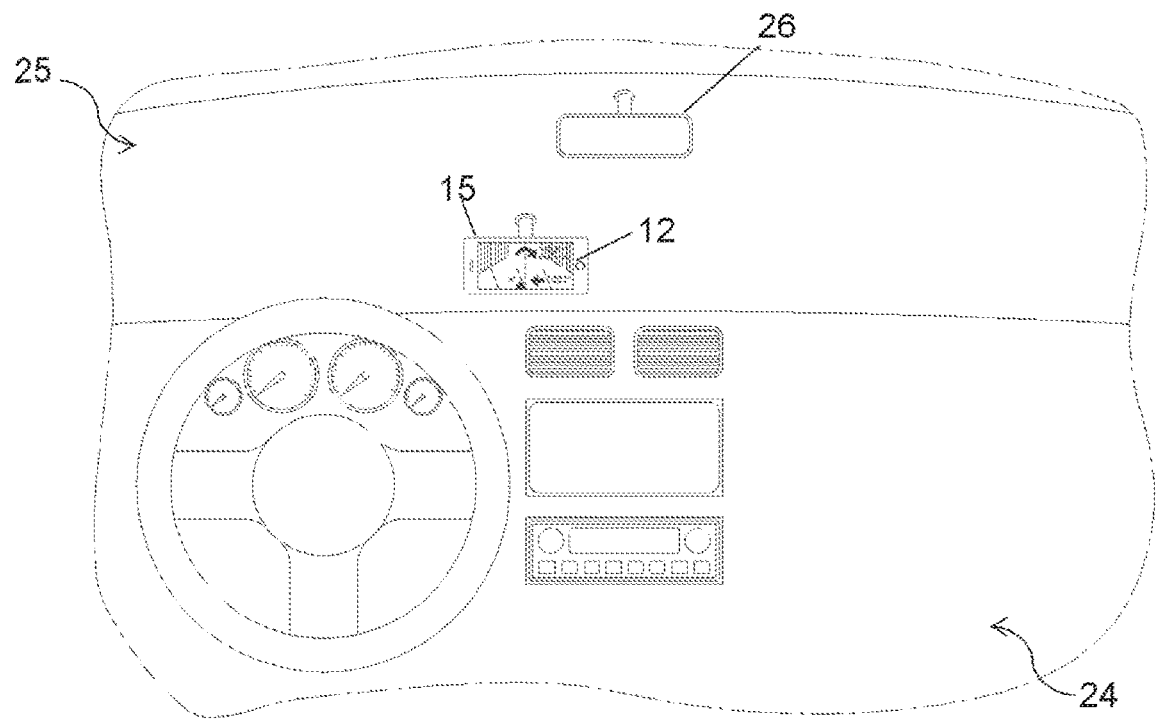
FIGS. 5A to 5F show different implementations and different locations of the display within the vehicle.
Figure 5B:
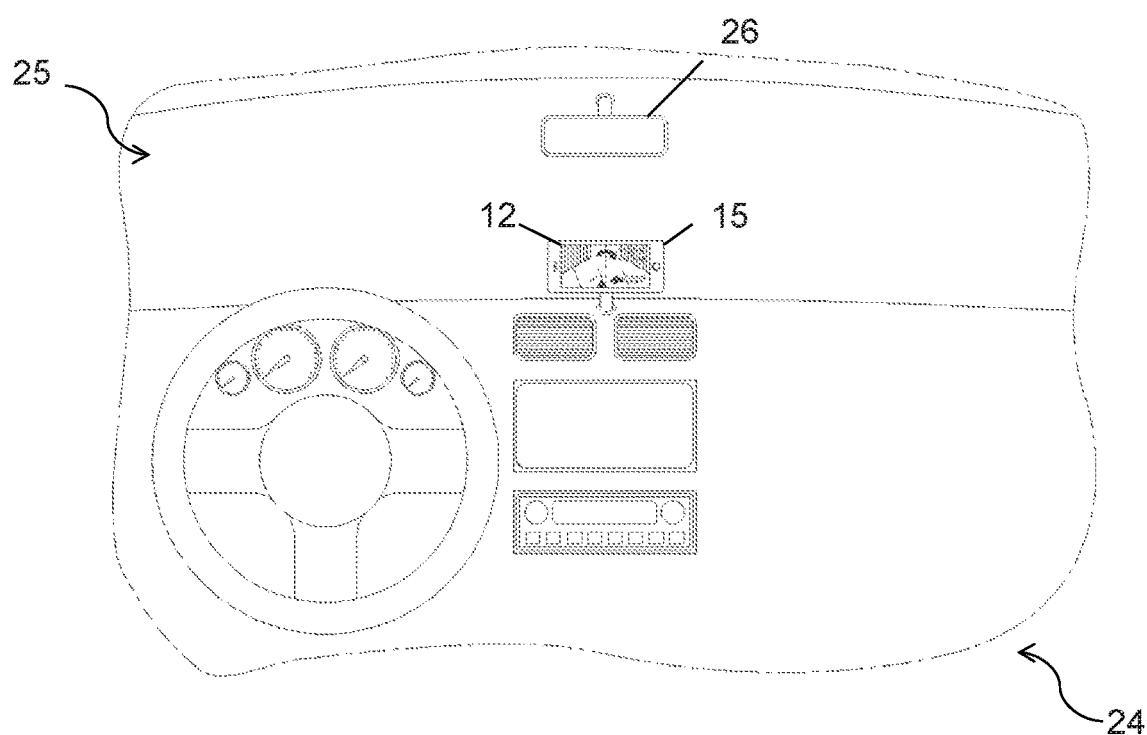
Figure 5C:
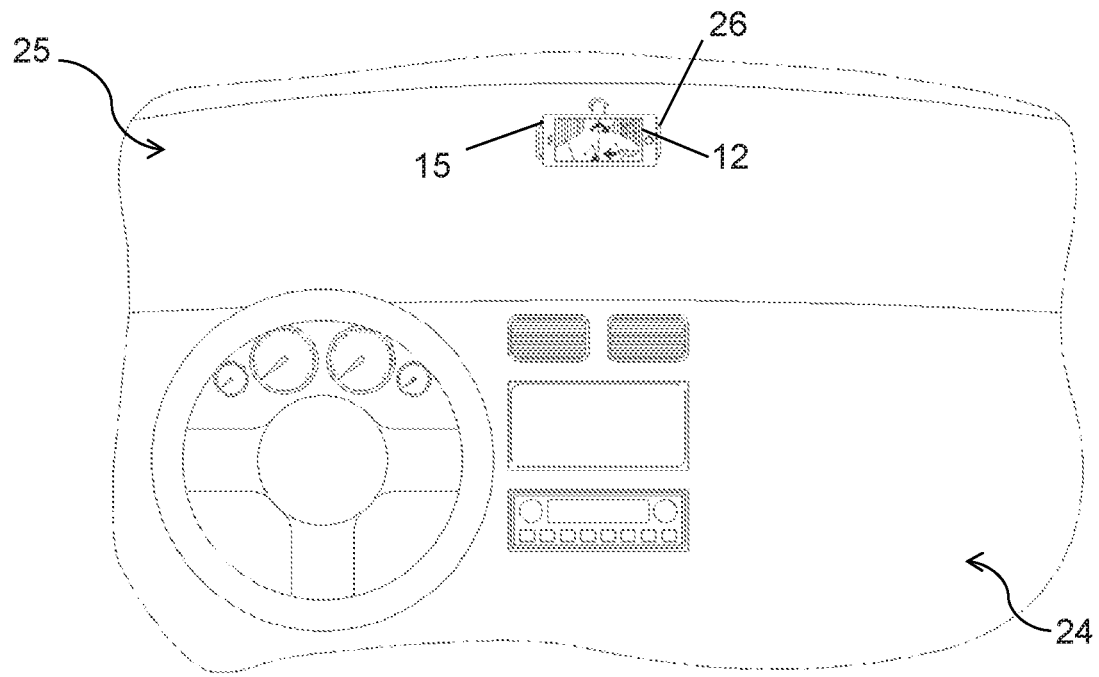
Figure 5D:
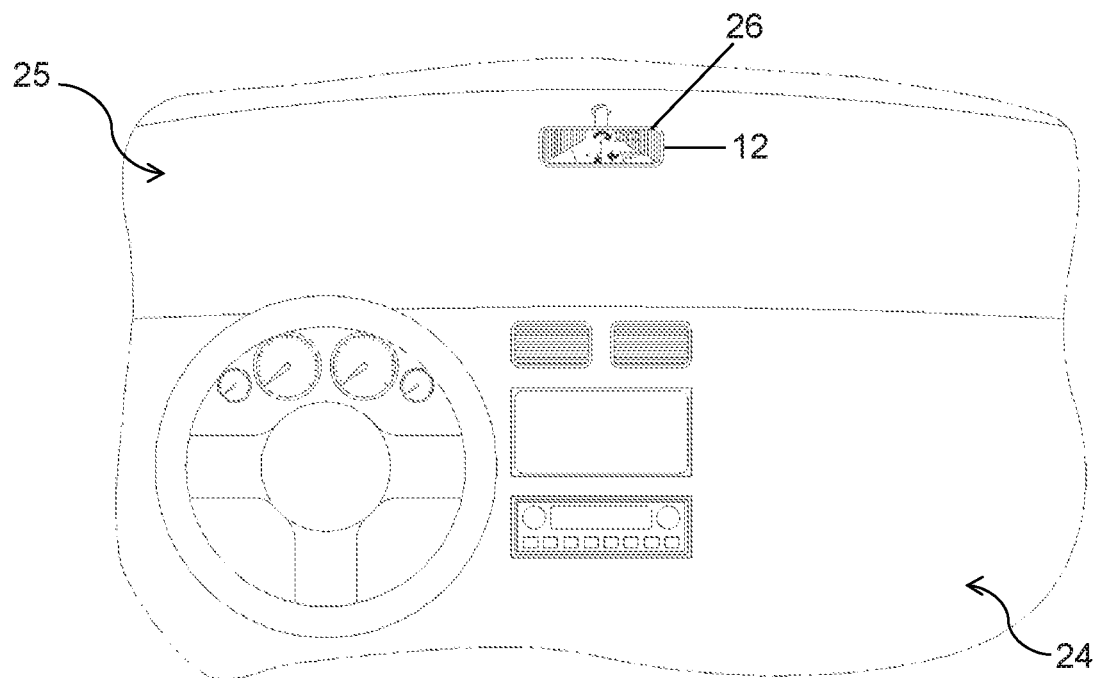
Figure 5E:
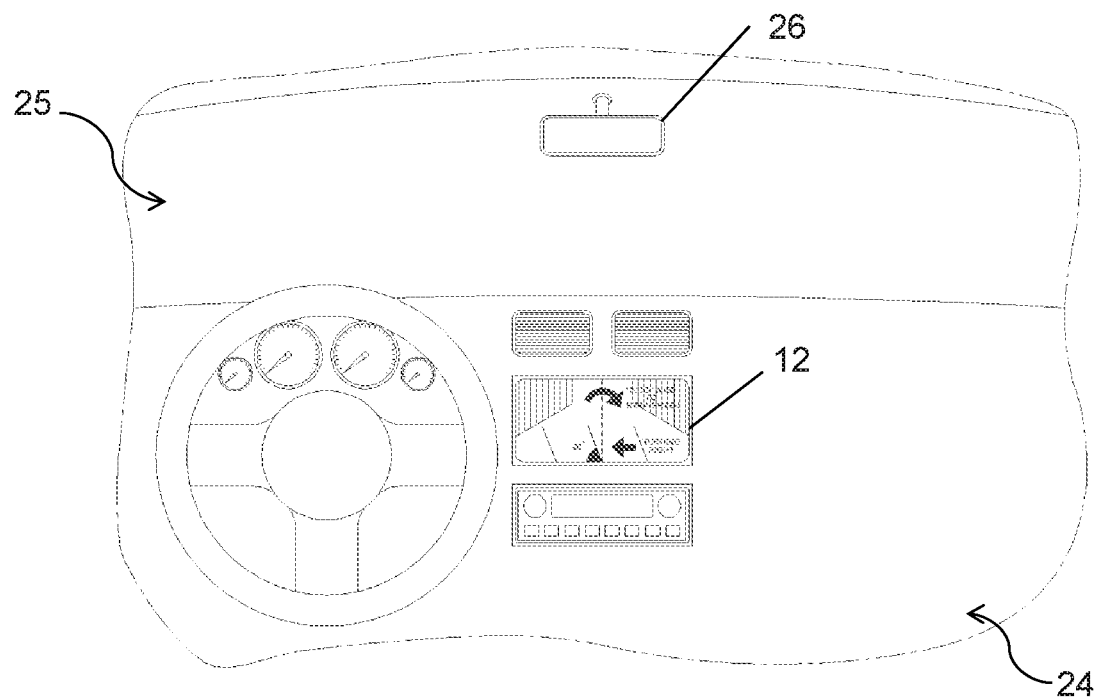
Figure 5F:
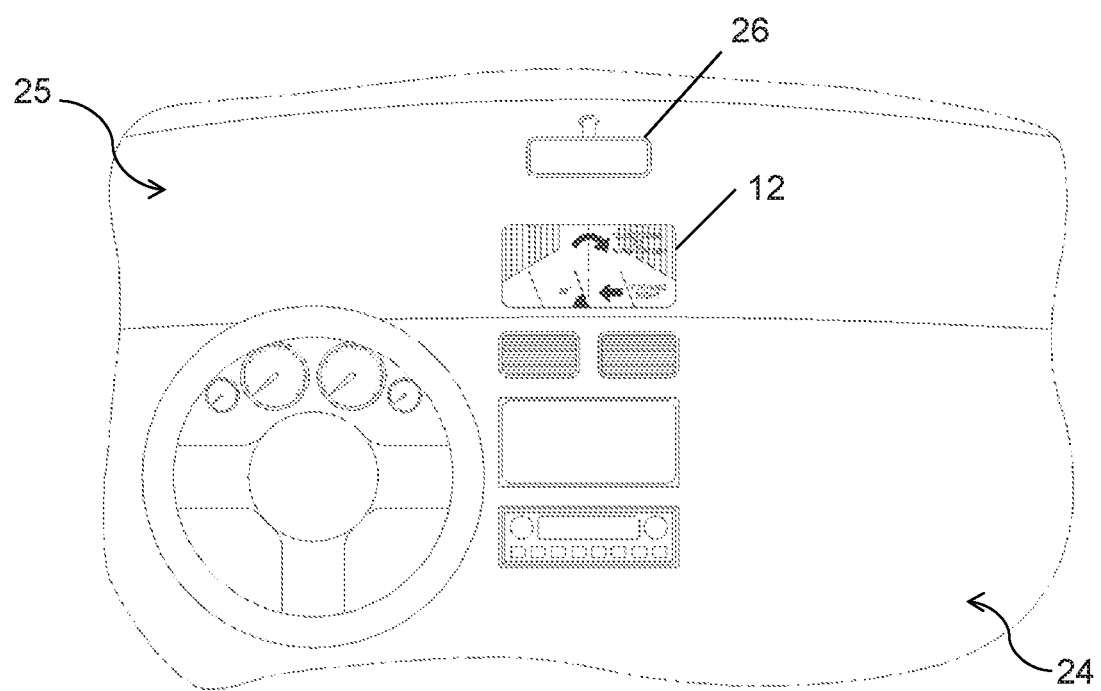

FIGS. 5A to 5B show different implementations of the display 12 and different locations of the display 12 within the vehicle 20. Each figure shows a representation of the front dashboard 24, windscreen 25 and rear-view mirror 26, of the vehicle 20. In FIG. 5A, the display 12 is part of the portable computing device 15, which is affixed (for example via a suction cup) to the windscreen 25. In FIG. 5B, the display 12 is part of the portable computing device 15, which is affixed to a surface of the dashboard 24. In FIG. 5C, the display 12 is part of the portable computing device 15 and is affixed to a rear-view mirror 26. In FIG. 5D, the display 12 is not part of the portable computing device 15, and is instead a feature of the rear-view mirror 26. The controller 11 is not shown; however, it is in communication with the display 12. In FIG. 5E, the display 12 is not part of the portable computing device 15, and is instead a feature of the vehicle 20 in that it is a part of the centre console of the dashboard 24. The controller 11 is not shown; however, it is in communication with the display 12. In FIG. 5F, the display 12 is not part of the portable computing device 15, and is instead a feature of the vehicle 20 in that it is a part of a heads-up display (HUD) projected onto the windscreen 25. In each case, the driver can view the display 12.

Figure 6A:
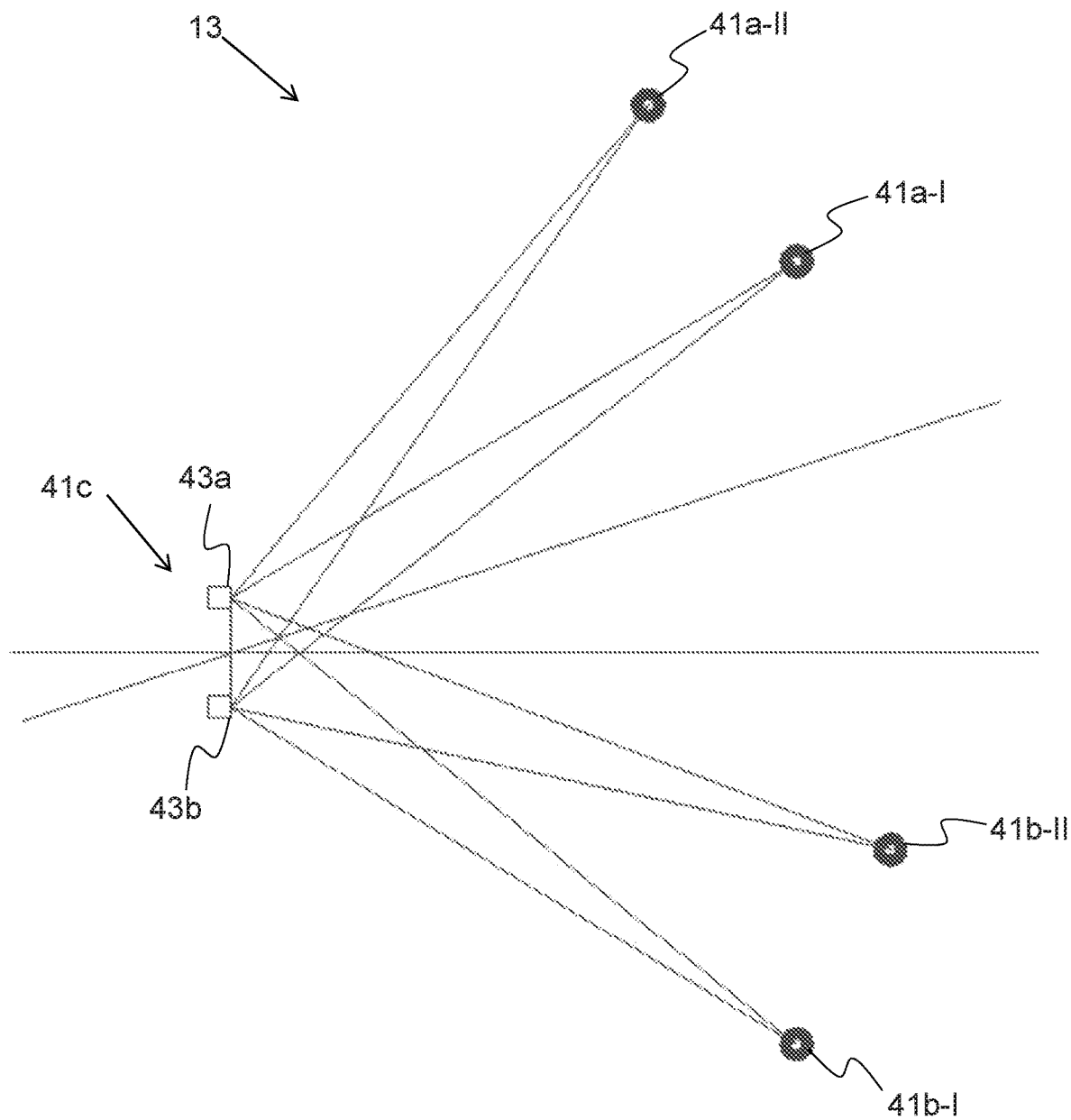
FIGS. 6A to 6D show angle measurement apparatuses according to embodiments.

FIG. 6A shows the operation of the angle measurement apparatus 13 according to the embodiment shown in FIG. 2, including the first wireless emitter 41a, the second wireless emitter 41b, and the target 41c. The term wireless is understood to include, for example, electromagnetic signals, which may be radio frequency electromagnetic signals as well as optical and infrared electromagnetic signals or any other suitable electromagnetic signal. The first and second wireless emitters 41a, 41b are positioned spaced apart on the trailer 21 and the target 41c is positioned on the vehicle 20. The figure shows the angle measurement apparatus 13 in a first position (I), where the wireless emitters 41a-I, 41b-I represent the trailer 21 aligned with the vehicle 20, and in a second position (II), where wireless emitters 41a-II, 41b-II represent the trailer 21 at an angle to the vehicle 20. The first and second wireless emitter 41a, 41b are configured to generated wireless signals suitable from which the target 41c is configured to determine distance measurements. The target 41c comprises two detection points 43a, 43b, each of which is configured to determine a distance between itself and each of the wireless emitters 41a, 41b. As can be seen, when the trailer 21 is aligned with the vehicle 20 (position (I)), the target 41c measures two distances (one associated with each detection point 43a, 43b) to the first wireless emitter 41a-I and two distances (again one associated with each detection point 43a, 43b) to the first wireless emitter 41b-I. From this, the relative angle (roughly 0 degrees) between the trailer 21 and vehicle 20 is determined, for example utilising the cosine rule. However, when there is a misalignment between the trailer 21 and the vehicle 20 (position (II)), the target 41c will obtain different distance measurements from each detection point 43a, 43b to each to the first wireless emitter 41a-II, 41b-II, and will therefore determine a different relative angle from 0 degrees (in the example, the angle is 18 degrees). Therefore, from the distances measured by the target 41c, the angle 30 can be calculated, thereby determining the measured angle.

According to an implementation, the target 41c communicates (typically wirelessly) the measured distances to the controller 11, and the controller 11 then undertakes calculations to determine the angle 30. In another implementation, the target 41c is in communication with an angle calculation unit (which may be positioned in the general area of the target 41c and may be in wired communication with the target 41c), and the angle calculation unit is configured to calculate the angle 30 and to communicate this measured angle to the controller 11. The angle calculation unit can be a component of the target 41c.

Figure 6B:
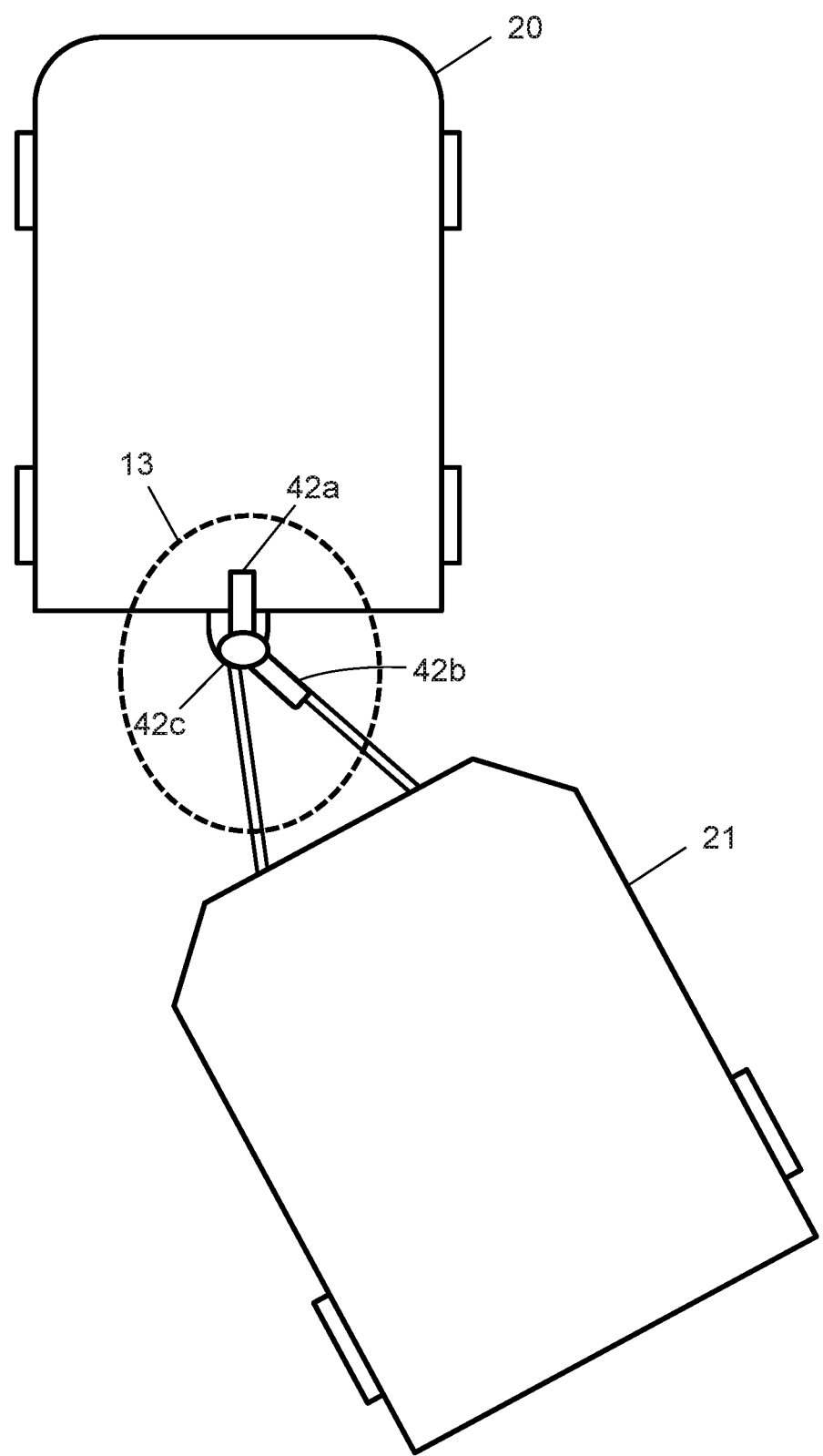
Figure 6C:
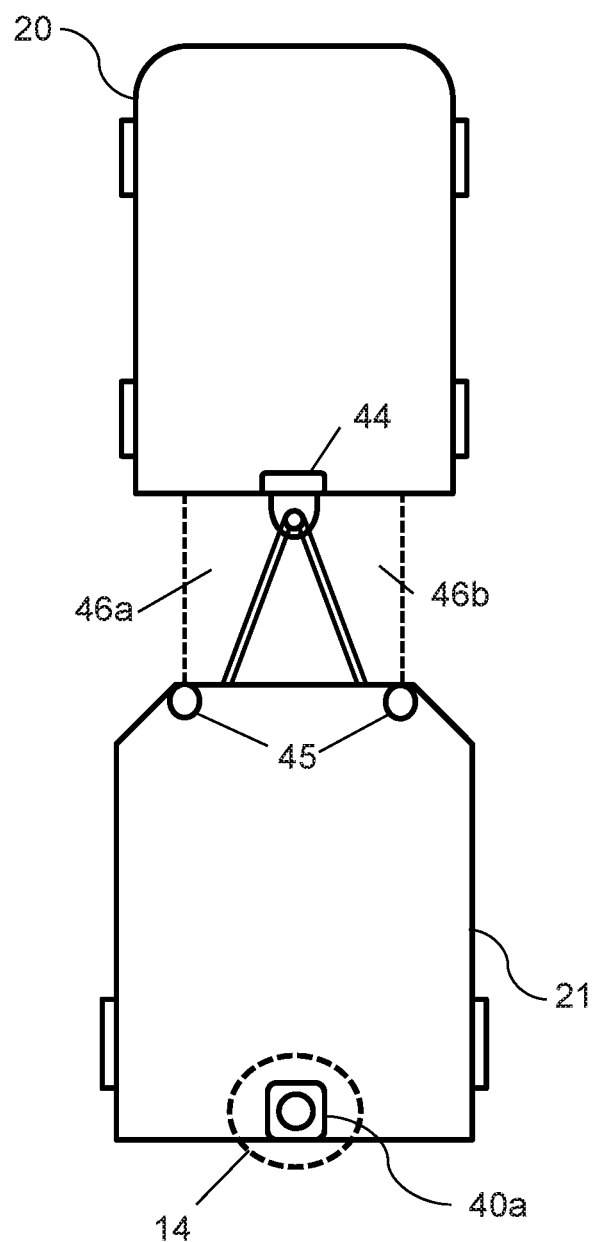
Figure 6D:
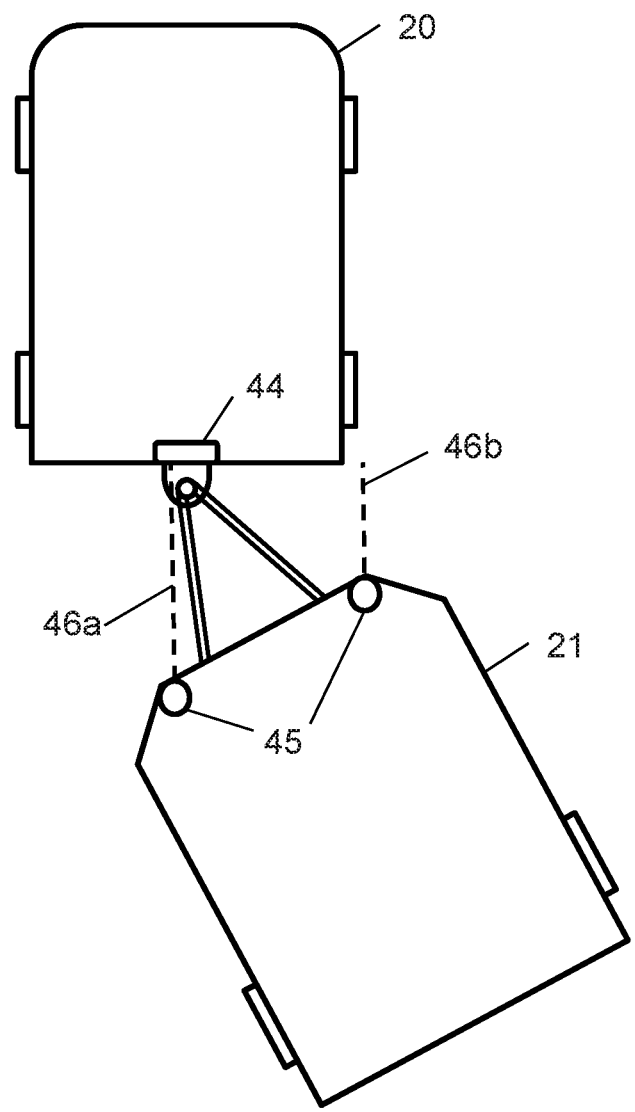

In another embodiment, as shown in FIGS. 6C and 6D, the angle measurement apparatus 13 comprises a time-of-flight (ToF) sensor 44, configured to determine a distance between at least one point on the trailer 21 and the vehicle 20. In a particular implementation, one or more targets 45 (two in the figure) are provided, and the distance 46a, 46b between each target and the vehicle 20 is measured by the ToF sensor 44. Form the one or more distances 46a, 46b an angle of the trailer 21 with respect to the vehicle 20 can be determined. The ToF sensor 44 is typically located approximately in line with the pivot point 22. In FIG. 6C, each of the distance 46a, 46b are equal, and therefore, it can be determined that the trailer 21 is aligned with the vehicle 20. In FIG. 6D, distance 46a is larger than distance 46b, and therefore, the angle 22 can be determined accordingly. Generally, there may be one or more ToF sensors 44 used for determining the angle 22.

The angle measurement apparatus 13 may instead comprise mechanical means coupled to an electronic sensor for generating angle measurements. In one implementation, as shown in FIG. 6B, the angle measurement apparatus 13 comprises a first connector 42a coupled to the vehicle 20 and a second connector 42b coupled to the trailer 21, wherein the first and second connectors 42a, 42b are rotatably coupled to one another. The angle measurement apparatus 13 also comprises an electronic sensor 42c configured to produce an electronic signal response to the current rotational position of the first connector 42a with respect to the second connector 42b, thereby producing a measurement of angle 30.

According to an embodiment, the angle measurement apparatus 13 includes its own power supply, such as a rechargeable battery. In another embodiment, the angle measurement apparatus 13 is configured to be powered by a power supply of the trailer 21 and/or the vehicle 20.

Figure 7A:
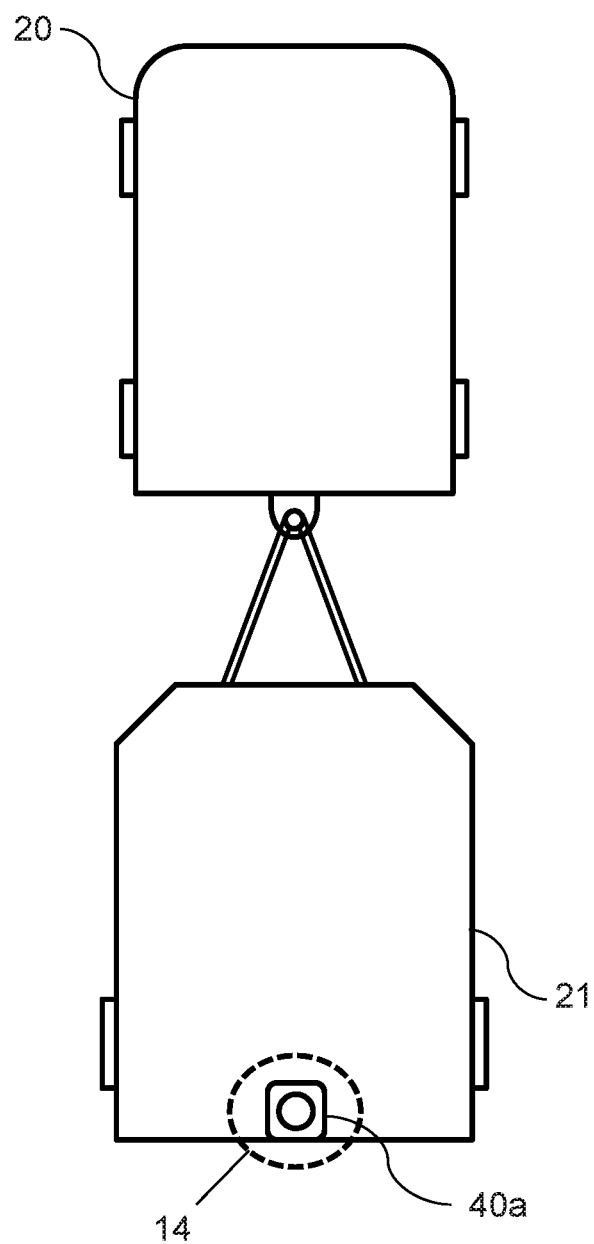
FIGS. 7A to 7C show different embodiments of the camera apparatus.
Figure 7B:
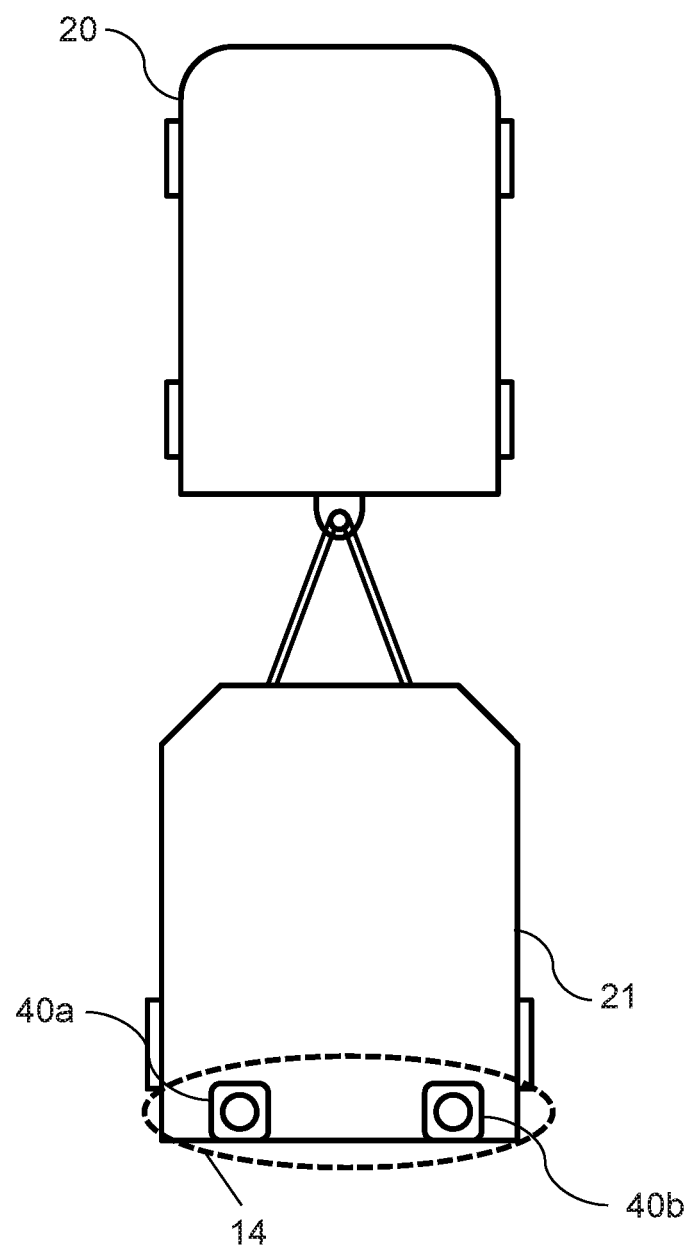
Figure 7C:
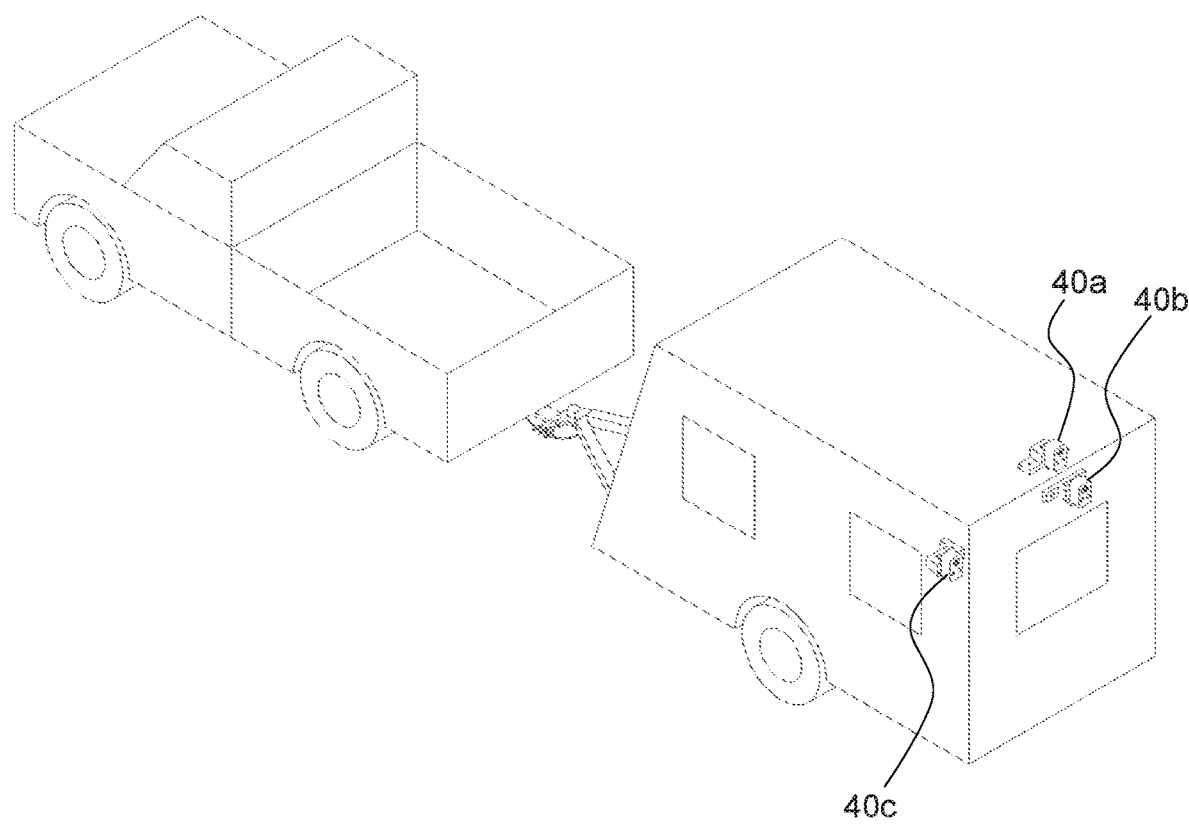

The camera apparatus 14 according to two embodiments is shown in FIGS. 7A to 7C. In FIG. 7A, the camera apparatus 14 comprises a single camera 40a attached to the rear of the trailer 21, with the sensor of the camera 40a positioned such as to obtain image data of the region behind the trailer 21. In FIG. 7B, the camera apparatus 14 comprises two cameras 40a, 40b, both attached to the rear of the trailer 21, with the sensor of each camera 40a, 40b positioned such as to obtain image data of the region behind the trailer 21. In FIG. 7C, three cameras 40a-c are shown attached to mounts, which are each affixed to a portion of the trailer 21 (which may be the rear of the trailer 21) such that each camera 40a-c is positioned so its sensor can capture a region behind the trailer. The mounts can extend above or to the side of the trailer 21. The different cameras 40a-c are used to illustrate possible mount points; it is not necessary that all three will be present.

According to an embodiment, the camera apparatus 14 includes its own power supply, such as a rechargeable battery. In another embodiment, the camera apparatus 14 is configured to be powered by a power supply of the trailer 21 and/or the vehicle 20.

Figure 8:
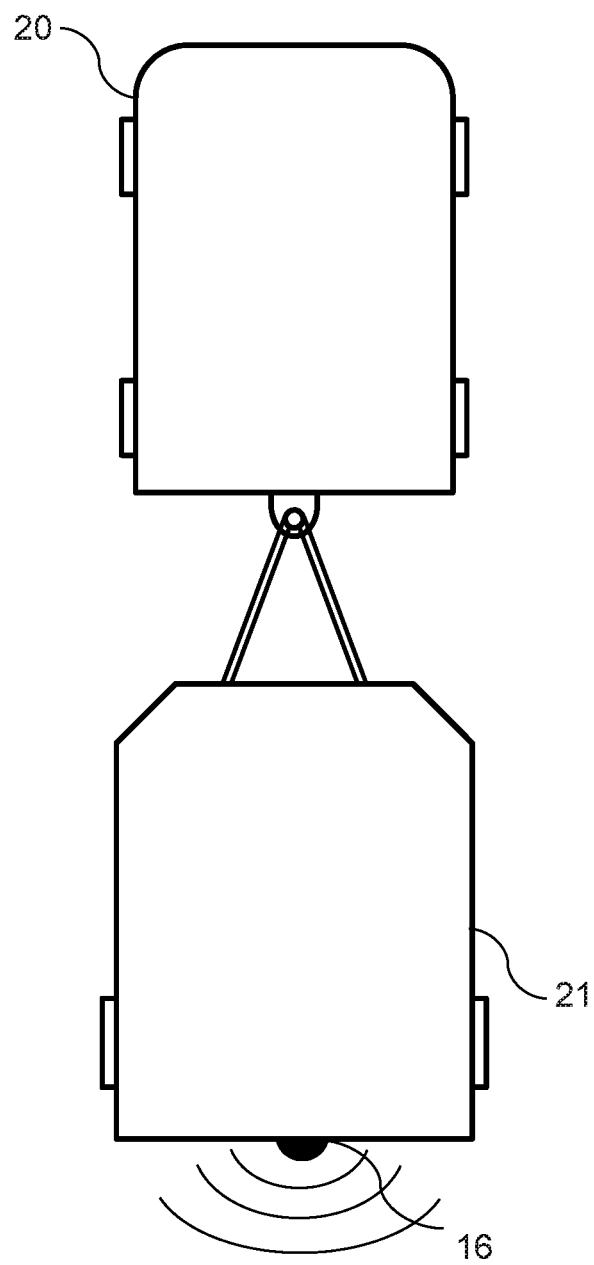
FIG. 8 shows a proximity sensor attached to the rear of a trailer.

Referring to FIG. 8, according to an embodiment, the system 10 further comprises one or more proximity sensors 16 (one is shown) positioned such as to determine a distance between the rear of the trailer 21 and objects located behind the trailer 21 ("proximity data"). The proximity sensors 16 are configured to provide proximity data to the controller 11, typically via wireless communication via a proximity controller to which the proximity sensors 16 are interfaced. The proximity data can then be utilised by the controller 11 when generating the auxiliary data.

Figure 9:
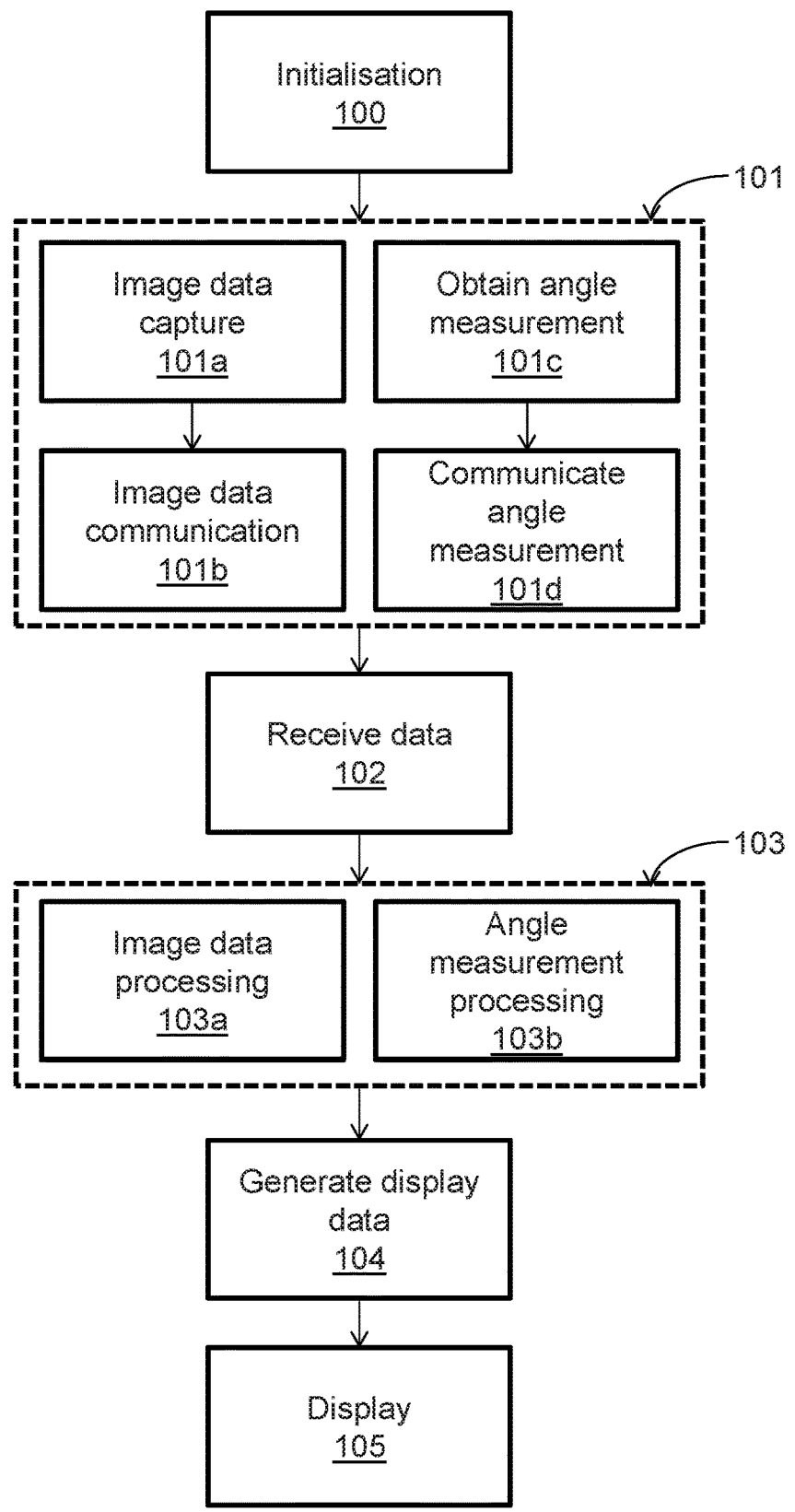
FIG. 9 shows a method for generating and displaying display data.

Referring to FIG. 9, a method is shown for generating and displaying display data. The system 10 is initialised at initialisation step 100. Where applicable, the initialisation step 100 can include starting an application stored on a portable computing device 15, the application causing the portable computing device 15 to implement the functionality of the controller 11 and display 12. The initialisation step 100 can also include putting the angle measurement apparatus 13 and/or the camera apparatus 14 into an active state, such as by "turning on" the angle measurement apparatus 13 and/or the camera apparatus 14. Generally, after initialisation step 100, the system 10 is able to generate the display data from signals received from the angle measurement apparatus 13 and the camera apparatus 14.

The method then proceeds to obtain image data and angle measurements at reversing data capture step 101. This step 101 includes the camera apparatus 14 capturing image data of the region behind the rear of the trailer 21 at image data capture step 101a, and communicating the captured image data to the controller 11 at image data communication step 101b. The reversing data capture step 101 also includes, in parallel, the angle measurement apparatus 13 obtaining an angle measurement at angle measurement step 101c, and communicating the angle measurement to the controller 11 at angle communication step 101d.

The image data can be captured as video data corresponding to a sequence of captured still frames (for example, having a sampling rate of one of 25 frames/sec, 10 frames/sec, or a variable number of frames/sec). The angle 30 can be measured intermittently (for example, periodically with a predefined period); that is, the angle measurements can be obtained intermittently. It is understood that the sampling rate of the image data and the period at which the angle measurements are obtained can be the same, but this is not envisioned for every embodiment. One of the image data and the angle measurements can be synchronised to the other, however this is also not envisioned for every embodiment.

The controller 11 receives the image data and the angle measurements at data reception step 102. The received image data and angle measurements are processed at processing step 103.

The processing step 103 includes processing the received image data at image data processing step 103a, and can include known image processing functions, such as cropping, contrast and brightness adjustment, sharpness adjustment. The image processing functions utilised can be either or both of preconfigured or selected by the driver of the vehicle 20. The processing step 103 also includes, in parallel, processing the received angle measurements at angle processing step 103b. The angle processing step 103b produces an output of auxiliary data, corresponding to a visual overlay suitable for overlaying the processed image data. The auxiliary data is configured to provide reversing aid information to the driver of the vehicle 20.

Display data is generated by combining the auxiliary data with the processed image data at display data generation step 104. The auxiliary data is typically overlayed onto the processed image data. The auxiliary data can comprise transparency information, such that portions of the auxiliary data overlay may show, with specified transparency, the underlying processed image data.

The display data is then communicated to and displayed on the display 12, at display step 105.

Generally, the method for generating and displaying display data is repeated continuously while the system 10 is in operation. It is understood the "continuously" means that the method is repeated on a frequent basis. As previously discussed, the image data may be captured at a different rate to the measurement of angle 30. The controller 11 is only required to "synchronise" this information when generating the display data, by producing the display data from the processed image data and the processed angle measurements.

The reversing aid information includes visual information suitable for providing the driver of the vehicle 20 with information to assist in reversing the trailer 21, typically generated, at least in part, from the most recently received angle measurement (the "current angle measurement"). For example, the reversing aid information can comprise one or more of graphics described with reference to FIGS. 4A and 4B.

Considering the current angle graphic 60, this can simply be generated in accordance with the value of the angle measurement received (or most recently received) by the controller 11. The angle rate of change graphic 61 can be generated in accordance with a rate of change measurement applied to the received angle measurements. Typically, the rate of change graphic will be generated in accordance with a recent history of measured angles including the current angle measurement (the number of angle measurements required can be predetermined). The jack-knife alert 62 is only presented as part of the reversing aid information when a predetermined threshold angle measurement is obtained; thus, the alert is generated in accordance with a test of the current angle measurement against the threshold angle measurement. The trailer direction graphic 63 is similar to the current angle graphic 60 in that it is generated in accordance with the current angle 30, however, instead of expressing the value of the angle 30, it expresses a direction (e.g. turning right, turning left, or straight). The direction to straighten graphic 64 is essentially the reverse of the trailer direction graphic 63, and is therefore also generated in accordance with the current angle measurement.

Figure 10:
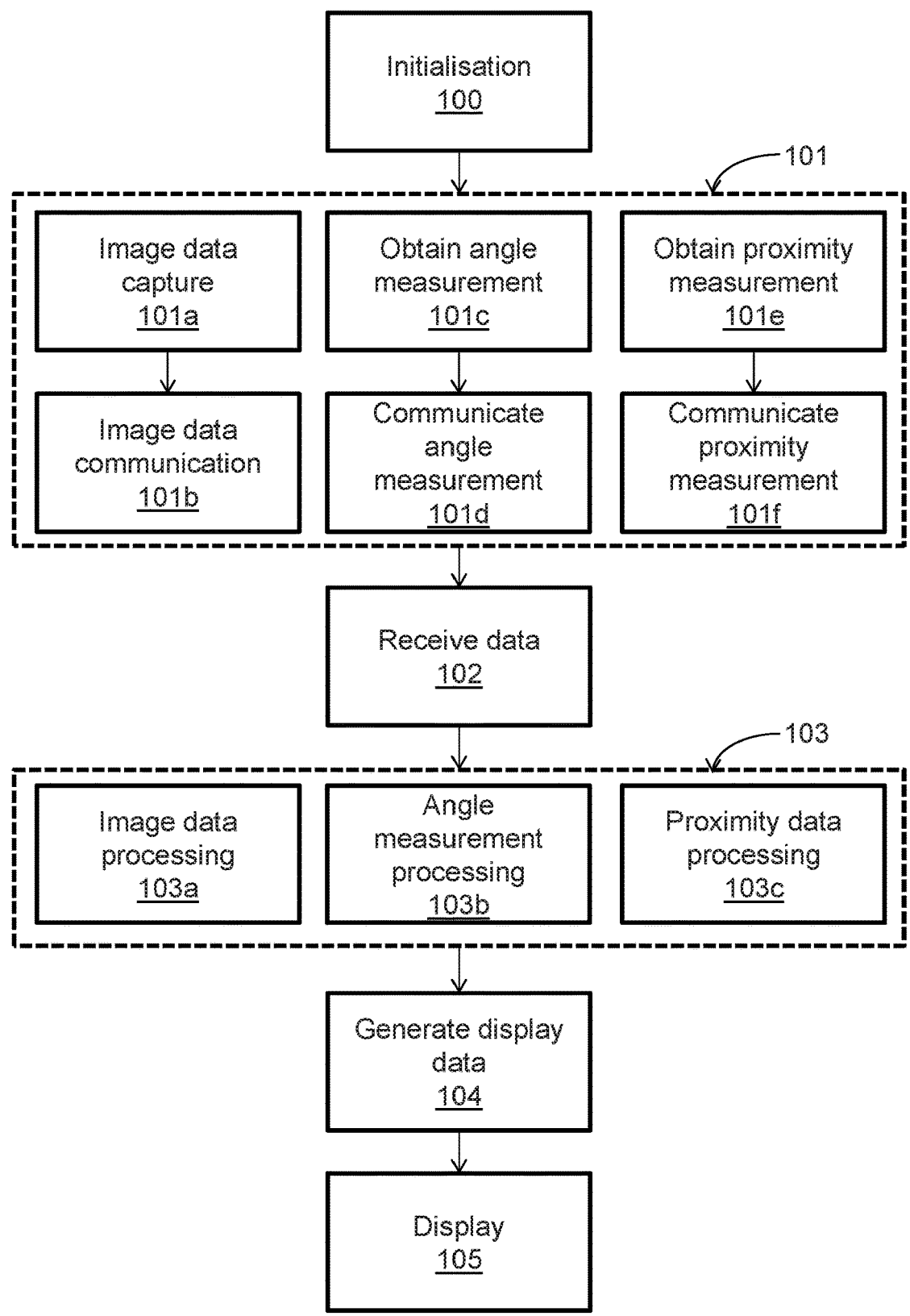
FIG. 10 shows a modified method for generating and displaying display data with a proximity alert on a display.

FIG. 10 shows a modification to the method for generating and displaying display data according to an embodiment, wherein proximity data is obtained from one or more proximity sensors 16 (see FIG. 8) representing the distance between the rear of the trailer 21 and at least one object located behind the trailer 21. The method is similar to that of FIG. 9, except that capture step 101 further comprises a step of obtaining proximity data from the one or more proximity sensors 16 at obtain proximity measurement step 101e, and communicating the proximity data to the controller 11, at proximity measurement communication step 101f. Processing step 103 also further comprises the controller 11 processing the received proximity data at proximity data processing step 103c.

Referring to FIG. 10, the proximity data can be utilised in order to generate a proximity alert graphic 65, indicating that there is at least one object within a specified distance of the rear of the trailer. Such a proximity alert advantageously provides the driver with information for avoiding a collision.

Figure 11:
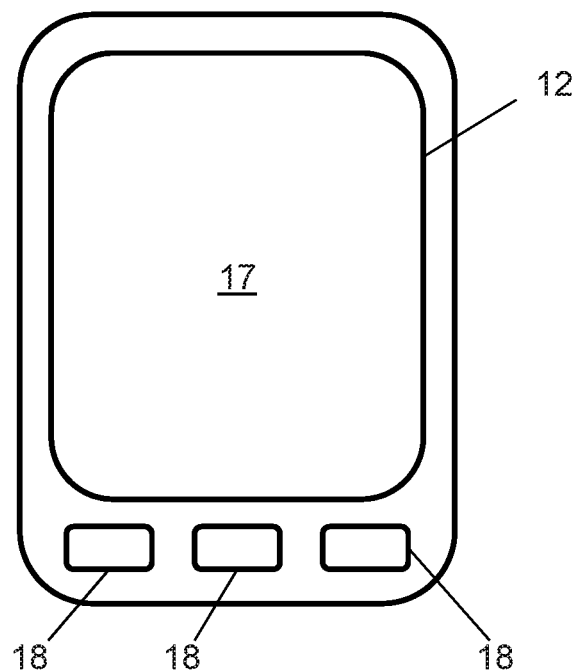
FIG. 11 shows the display including user inputs in the form of a touchscreen and buttons.

According to an embodiment, a driver of a vehicle 20 is provided with an driver input means, such as a touchscreen 17 of the display 12 and/or one or more button 18 inputs, as shown in FIG. 11. Although FIG. 11 shows both a touchscreen 17 and one or more buttons 18, only one of these may be provided. The driver interacts with the driver input means in order to provide an input to the controller 11 indicating an intended direction for the trailer 21 to be moved towards. This may be utilised by the controller 11 to generate a direction advice graphic as part of the auxiliary data. The direction advice graphic indicates a necessary driving action (e.g. turn the steering wheel to the left or the right, or no change to the steering wheel) in order to achieve the direction indicated by the driver via the driver input means. The direction advice graphic is generated in accordance with at least the driver input and the current angle.

Figure 12:
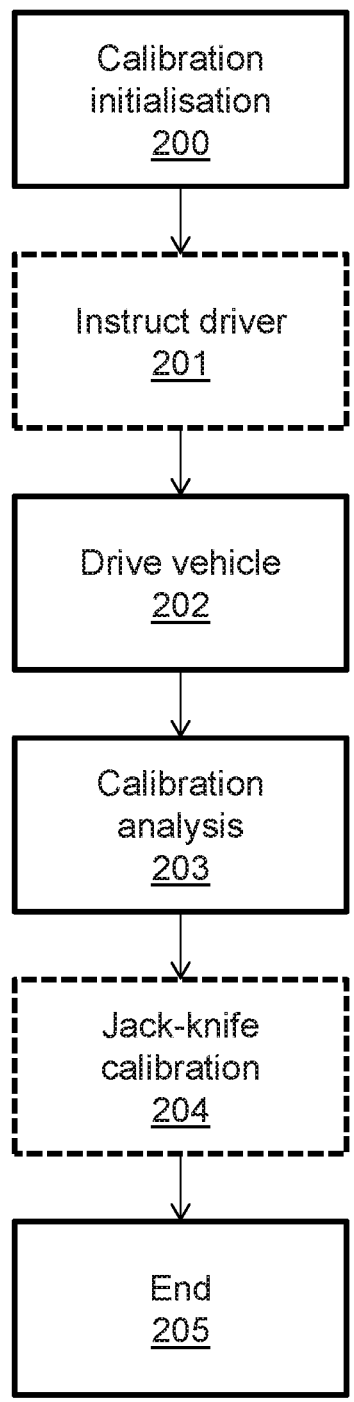
FIG. 12 shows a method of calibrating the angle measurement apparatus.

According to an embodiment, the system 10 comprises a calibration unit for calibrating the controller 11, such that the measured angle accurately represents the actual angle 30. The calibration unit can correspond to the driver indicating a "zero" angle when the trailer 21 and vehicle 20 are aligned. In another embodiment, the calibration unit performs a calibration method as shown in FIG. 12. The calibration unit, in an embodiment, is a module implemented by the controller 11. In another embodiment, the calibration unit is a module of the angle measurement apparatus 13.

First, the calibration unit is initialised at calibration initialisation step 200. The calibration unit may be initialised at the same time as the controller 11 (see initialisation step 100), or may result from an action of the driver such as selecting calibration from a menu. The controller 11 then optionally causes the display 12 to present an instruction to the driver to begin driving the vehicle 20 and trailer 21 at optional instruct driver step 201, preferably along predominantly straight road. In any event, the driver begins driving the vehicle 20 and trailer 21 at driving step 202.

The output of the angle measurement apparatus 13 is intermittently obtained by the controller 11 (typically periodically) such that a number of values for the measured angle are obtained. Seeing as the vehicle 20 is driving along substantially straight road, these measurements will take on predominantly around the same value. At calibration analysis step 203, these measurements are analysed using a statistical analysis in order to calculate the mean angle measurement, which is assumed to correspond to an angle 30 of zero. Steps 202 and 203 are repeated until sufficient data is obtained to accurately determine the measured value corresponding to the angle 30 of zero.

At optional jack-knife calibration step 204, the driver utilised the driver input means to specify a minimum angle 30 corresponding to a jack-knife event. This is utilised as the predetermined angle 30 required for generating a jack-knife alert. Calibration then completes at end step 205.

Further modifications can be made without departing from the spirit and scope of the specification. For example, the controller 11 can be interfaced with one or more speakers. Under certain conditions, the controller 11 is configured to cause an audio output by the speakers. For example, if the rate of change of the angle 30 exceeds a predetermined value, a sound may be produced. In another example, a sound is produced in addition to a jack-knife alert 62.

In another example, the camera apparatus 14 can comprise cameras 40 which are components of a "smart" tail-light system; the cameras 40 are part of an apparatus comprising a tail-light. This system may be provided as an attachment for affixing to a trailer 21, or may be provided as part of the trailer 21.

What is claimed is:

1. A method for providing a driver of a vehicle towing a trailer with reversing information, comprising the steps of:
    capturing image data of a region behind the trailer;
    measuring an angle between the vehicle and the trailer using an angle measurement apparatus, wherein the angle measurement apparatus comprises: a first wireless emitter for generating a first wireless signal; a second wireless emitter for generating a second wireless signal; and a target comprising two spaced apart detection points for receiving the first and second wireless signals, wherein the angle measurement is based on a determination of distances between the first wireless emitter and the target and the second wireless emitter and the target;
    generating auxiliary data comprising reversing aid information at least in part in accordance with the angle;
    generating display data in accordance with the image data and the auxiliary data; and
    presenting the display data on a display,
    wherein measuring the angle includes measuring a direction and a magnitude of said angle.

2. A method as claimed in claim 1, comprising capturing the image data with a camera apparatus comprising at least one camera positioned facing the region behind the trailer, and wherein the image data comprises video data captured by the, or each, camera.

3. A method as claimed in claim 1, wherein the target is positioned on the vehicle and the first and second wireless emitters are positioned spaced apart from one another on the trailer.

4. A method as claimed in claim 1, wherein the auxiliary data corresponds to an overlay that is suitable for overlaying onto the image data.

5. A method as claimed in claim 1, wherein the reversing of the aid information comprises one or more of: a current angle graphic for indicating the current angle between trailer and vehicle; an angle rate of change graphic for indicating a current rate at which the angle is changing; a trailer direction graphic for indicating a direction of movement; a direction to straighten graphic for providing a graphical indication of which direction to steer in order to cause the angle to reduce to zero degree; a jack-knife alarm for indicating when the angle is greater than a threshold angle; and a distance indicator for indicating the distance between a rear of the trailer and an object located behind the trailer.

6. A method as claimed in claim 1, further comprising the steps of:
communicating the captured image data to a controller;
determining the angle measurement at an angle calculation unit in wired communication with the target;
communicating the angle to the controller; and
generating the auxiliary data with the controller in accordance with the angle and the display data.

7. A method as claimed in claim 6, wherein the controller is interfaced with the display so as to cause the display to display the display data, and wherein the display and the controller are components of the same device or wherein the display is a feature of the vehicle.

8. A method as claimed in claim 1, further comprising the step of:
obtaining proximity information indicative of a distance between a rear of the trailer and an object located behind the trailer,
wherein the auxiliary data is at least in part generated in accordance with the proximity information.

9. The method of claim 1, further comprising:
communicating the captured image data to a controller;
communicating the determination of distances to the controller;
determining, by the controller, the angle measurement from the determination of distances; and
generating the auxiliary data with the controller in accordance with the angle and the display data.

10. A reversing aid system for providing a driver of a vehicle towing a trailer with reversing information, the reversing aid system comprising:
a camera apparatus comprising at least one camera configured to capture image data of a region behind the trailer;
an angle measurement apparatus configured to generate an angle measurement corresponding to a measurement of an angle between the vehicle and the trailer;
a display configured to display received display data; and
a controller configured to:
receive the angle measurement from the angle measurement apparatus or derive the angle measurement from information received from the angle measurement apparatus, said information sufficient to enable said derivation;
receive the image data from the camera apparatus;
generate auxiliary data comprising reversing aid information at least in part in accordance with angle measurement;
generate display data in accordance with the image data and the auxiliary data; and
communicate the display data to the display,
wherein the angle measurement apparatus comprises:
a first wireless emitter for generating a first wireless signal;
a second wireless emitter for generating a second wireless signal; and
a target comprising two spaced apart detection points for receiving the first and second wireless signals,
wherein the angle measurement is based on a determination of distances between the first wireless emitter and the target and the second wireless emitter and the target,
wherein the angle measurement includes a direction and a magnitude of said angle.

11. A system as claimed in claim 10, wherein the image data comprises video data captured by the at least one, or each, camera.

12. A system as claimed in claim 10, wherein the auxiliary data corresponds to an overlay of the image data.

13. A system as claimed in claim 10, wherein the reversing of the aid information comprises one or more of: a current angle graphic for indicating the current angle between trailer and vehicle; an angle rate of change graphic for indicating a current rate at which the angle is changing; a trailer direction graphic for indicating a direction of movement; a direction to straighten graphic for providing a graphical indication of which direction to steer in order to cause the angle to reduce to zero degree; a jack-knife alarm for indicating when the angle is greater than a threshold angle; and a distance indicator for indicating the distance between a rear of the trailer and an object located behind the trailer.

14. A system as claimed in claim 10, wherein the controller is interfaced with the display such as to cause the display to display the display data, and wherein the display and the controller are components of the same device or wherein the display is a feature of the vehicle.

15. A system as claimed in claim 10, further comprising one or more proximity sensors configured to obtain proximity information indicative of a distance between a rear of the trailer and an object located behind the trailer, and communicate said proximity information to the controller, wherein the auxiliary data is at least in part generated in accordance with the proximity information.

16. The system of claim 10, wherein the target is configured for locating on the vehicle and the first and second wireless emitters are configured for locating spaced apart from one another on the trailer.

17. The system of claim 10, wherein the controller is configured to:
receive the determination of distances from the angle measurement apparatus and thereby determine the angle measurement.

18. The system of claim 10, wherein the angle measurement apparatus is configured to determine the angle measurement from the determination of distances, and to communicate the angle measurement to the controller.

19. A method for operating a portable computing device to provide a driver of a vehicle towing a trailer with reversing information, wherein the portable computing device comprises a controller and a display interfaced with the controller, comprising the steps of:
receiving, at the controller, image data of a region behind the trailer captured by at least one camera;
receiving at the controller an angle measurement from an angle measurement apparatus corresponding to an angle between the vehicle and the trailer or deriving the angle measurement from information received from the angle measurement apparatus, said information sufficient to enable said derivation;

generating auxiliary data comprising reversing aid information at least in part in accordance with the measured angle;
generating display data in accordance with the image data and the auxiliary data;
the controller providing the display data to the display; and
the display presenting the display data,
wherein the angle measurement apparatus comprises: a first wireless emitter for generating a first wireless signal; a second wireless emitter for generating a second wireless signal; and a target comprising two spaced apart detection points for receiving the first and second wireless signals, wherein the angle measurement is based on a determination of distances between the first wireless emitter and the target and the second wireless emitter and the target, and
wherein the angle measurement includes a direction and a magnitude of said angle.

20. The method of claim 19, wherein the target is positioned on the vehicle and the first and second wireless emitters are positioned spaced apart from one another on the trailer.

* * * * *